United States Patent
Ellis et al.

(10) Patent No.: US 9,525,914 B2
(45) Date of Patent: *Dec. 20, 2016

(54) SYSTEMS AND METHODS FOR REDUCING CUT-OFFS IN PROGRAM RECORDING

(71) Applicant: Rovi Guides, Inc., San Carlos, CA (US)

(72) Inventors: Michael D. Ellis, Boulder, CO (US); David M. Berezowski, Tulsa, OK (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,178

(22) Filed: Apr. 4, 2016

(65) Prior Publication Data
US 2016/0219334 A1 Jul. 28, 2016

Related U.S. Application Data

(63) Continuation of application No. 12/775,025, filed on May 6, 2010, now Pat. No. 9,307,278, which is a
(Continued)

(51) Int. Cl.
*H04N 21/458* (2011.01)
*H04N 21/466* (2011.01)
(Continued)

(52) U.S. Cl.
CPC ...... *H04N 21/4583* (2013.01); *H04N 5/44543* (2013.01); *H04N 5/782* (2013.01);
(Continued)

(58) Field of Classification Search
None
See application file for complete search history.

(56) References Cited

U.S. PATENT DOCUMENTS 3,594,778 A 7/1971 Herald et al.
5,661,526 A 8/1997 Hamamoto et al.
(Continued)

FOREIGN PATENT DOCUMENTS

EP 0 836 320 4/1998
GB 2229595 9/1990
(Continued)

OTHER PUBLICATIONS

Agrawal et al. "Use of Statistical Methods to Reduce Delays for Media Playback Buffering," Multimedia Computing and Systems, Proceedings, IEEE International, Jun. 28, 1998.

*Primary Examiner* — Justin Shepard
(74) *Attorney, Agent, or Firm* — Ropes & Gray LLP

(57) ABSTRACT

A media recording system may be provided. The recording system may include features for reducing recording cut-off of a particular media event due to changes in the start time and end time of what is scheduled to be recorded. The recording system may provide a user with an opportunity to select a program by for example, selecting a listing, to have that program automatically recorded at a scheduled time for presentation to viewers. Changes in the schedule of programs may be compensated manually or automatically when the recording system receives information about actual or predicted time changes. In a manual mode, a user may adjust start or end times based on time change information that is displayed. For an automatic mode, the recording system may automatically compensate for predicted or actual time changes that are known by automatically adjusting the start and end times of recording.

18 Claims, 21 Drawing Sheets

Related U.S. Application Data continuation of application No. 12/634,154, filed on Dec. 9, 2009, now abandoned, which is a continuation of application No. 09/821,005, filed on Mar. 29, 2001, now abandoned.

(60) Provisional application No. 60/193,949, filed on Mar. 31, 2000.

(51) Int. Cl.

| | | |
|---|---|---|
| *H04N 5/445* | (2011.01) | |
| *H04N 5/782* | (2006.01) | |
| *H04N 7/088* | (2006.01) | |
| *H04N 21/4147* | (2011.01) | |
| *H04N 21/433* | (2011.01) | |
| *H04N 21/435* | (2011.01) | |
| *H04N 21/443* | (2011.01) | |
| *H04N 21/462* | (2011.01) | |
| *H04N 21/47* | (2011.01) | |
| *H04N 21/472* | (2011.01) | |
| *H04N 21/478* | (2011.01) | |
| *H04N 21/8545* | (2011.01) | |
| *H04N 5/775* | (2006.01) | |
| *H04N 5/781* | (2006.01) | |
| *H04N 5/85* | (2006.01) | |
| *H04N 21/422* | (2011.01) | |
| *H04N 21/431* | (2011.01) | |

(52) U.S. Cl.
CPC ......... *H04N 7/088* (2013.01); *H04N 21/4147* (2013.01); *H04N 21/4334* (2013.01); *H04N 21/4351* (2013.01); *H04N 21/443* (2013.01); *H04N 21/458* (2013.01); *H04N 21/466* (2013.01); *H04N 21/4622* (2013.01); *H04N 21/4667* (2013.01); *H04N 21/47* (2013.01); *H04N 21/478* (2013.01); *H04N 21/47214* (2013.01); *H04N 21/47217* (2013.01); *H04N 21/8545* (2013.01); *H04N 5/775* (2013.01); *H04N 5/781* (2013.01); *H04N 5/85* (2013.01); *H04N 21/42204* (2013.01); *H04N 21/4316* (2013.01)

(56) References Cited

U.S. PATENT DOCUMENTS

| | | |
|---|---|---|
| 5,668,917 A | 9/1997 | Lewine |
| 5,963,264 A | 10/1999 | Jackson |
| 6,002,394 A | 12/1999 | Schein et al. |
| 6,118,926 A | 9/2000 | Kim et al. |
| 6,185,360 B1 | 2/2001 | Inoue et al. |
| 6,208,799 B1 | 3/2001 | Marsh et al. |
| 6,252,629 B1 | 6/2001 | Takatori |
| 6,430,359 B1 | 8/2002 | Yuen et al. |
| 6,681,396 B1 | 1/2004 | Bates et al. |
| 6,771,885 B1 | 8/2004 | Agnihotri et al. |
| 7,242,988 B1 | 7/2007 | Hoffberg et al. |
| 2002/0054068 A1 | 5/2002 | Ellis et al. |
| 2010/0150528 A1 | 6/2010 | Ellis et al. |
| 2010/0215341 A1 | 8/2010 | Ellis et al. |
| 2010/0220976 A1 | 9/2010 | Ellis et al. |

FOREIGN PATENT DOCUMENTS

| | | |
|---|---|---|
| JP | 10-021601 | 1/1998 |
| JP | H 11-243521 A | 9/1999 |
| WO | WO 00/16548 A1 | 3/2000 |

RECORDING

RECORDED SELECTIONS

| CHANNEL | TITLE | RECORDED | DURATION |
|---|---|---|---|
| 5 FOX | TERMINATOR | 11/10/00 | 8:00P-10:00P |
| 50 NBC | SEINFELD | 11/10/00 | 10:00P-10:30P |
| 50 NBC | CHEERS | 11/10/00 | 11:00P-11:30P |

PENDING SELECTIONS

| CHANNEL | TITLE | RECORDED |
|---|---|---|
| 77 HBO | TITANIC | 11/11/00 7:00P |
| 100 NBC | FRIENDS | 11/11/00 8:00P |
| 104 ESPN | SPORTS CENTER | 11/12/00 7:30A |

*FIG. 9*

SYSTEMS AND METHODS FOR REDUCING CUT-OFFS IN PROGRAM RECORDING

CROSS REFERENCE TO RELATED APPLICATION

This application is a continuation of U.S. patent application Ser. No. 12/775,025, filed May 6, 2010, now allowed, which is a continuation of U.S. patent application Ser. No. 12/634,154, filed Dec. 9, 2009, now abandoned, which is a continuation of U.S. patent application Ser. No. 09/821,005, filed Mar. 29, 2001, now abandoned, which claims the benefit of U.S. provisional patent application Ser. No. 60/193,949, filed Mar. 31, 2000, each of which is hereby incorporated by reference herein in its entirety.

BACKGROUND OF THE INVENTION

This invention relates to media recording systems. More particularly, this invention relates to media recording systems that provide a reduction in media cut-off when media that is distributed at imprecise intervals is recorded.

Video and audio media, such as television programs, pay-per-view programs, near-video-on-demand (NVOD) programs, video-on-demand (VOD) programs, music, promotional material, and other types of media, are typically distributed to viewers over wired and wireless networks. Suitable wired and wireless networks may include, for example, broadcast television system networks, one-way and two-way cable television system networks, digital broadcasting services (DBS) and other satellite delivery services networks, the Internet, and other suitable types of networks. Users' media viewing and listening experiences are typically dictated by the distribution schedules of media providers. With the advent of audio cassette recorders, videocassette recorders, and other media recording devices, users currently have the ability to replicate or time-shift their viewing and listening experiences; they may record programs, in an attended or unattended fashion, and play back the programs for later viewing or listening.

More recently, products have been developed that allow users to manage their viewing experiences and record media with increased flexibility. Personal video recorders (PVRs), such as those provided by TIVO and REPLAY, record programs on hard-disk drives. Users can schedule programs for recording and play them back at a later time. These systems also record what users are watching in real-time, allowing the users to pause real-time programs when, for example, the user has to leave the room. Upon returning, users may resume their viewing where they left off, and may even fast forward through commercials until they reach the point at which the program is provided. Users may also rewind programs.

Another technology that has reshaped the way users view and manage television is the interactive television program guide. Interactive television program guides are well known. Illustrative interactive television program guides are described, for example, in Knee et al. U.S. Pat. No. 5,589,892 and Knudson et al. U.S. patent application Ser. No. 09/357,941, filed Jul. 16, 1999, which are hereby incorporated by reference herein in their entireties. Interactive television program guides may be based on a number of different hardware platforms. Suitable hardware that may be used in implementing a program guide includes hardware such as satellite receivers, personal computer televisions (PC/TVS), personal computers (e.g., with television tuner cards), cable set-top boxes, or any other suitable hardware.

Interactive program guides may allow users to record programs on digital or analog storage devices (e.g., videocassettes, hard disks, floppy discs, flash memory, recordable compact discs "CDs", recordable digital versatile discs "DVDs", or any other type of storage). Interactive program guides and features for controlling videocassette recorders are described, for example, in Ellis et al. U.S. patent application Ser. No. 08/924,239, filed Sep. 5, 1997, which is hereby incorporated by reference herein in its entirety. Interactive program guides having digital storage for use in recording are described, for example, in Hassell et al. U.S. patent application Ser. No. 09/157,256, filed Sep. 17, 1998, which is hereby incorporated by reference herein in its entirety.

Programs may also be recorded on a program guide, the Internet, or other server. Client-server program guide systems are described, for example, in Ellis et al. U.S. patent application Ser. No. 09/374,043, filed Aug. 13, 1999, which is hereby incorporated by reference herein in its entirety. Client-server guides with remote server recording are described, for example, in Ellis et al. U.S. patent application Ser. No. 09/332,244, filed Jun. 11, 1999, which is hereby incorporated by reference herein in its entirety. The program guide server may be located at the cable system headend or other suitable location. The program guide may be an on-line program guide, which may be implemented using a web server on the Internet. On-line program guide systems are described, for example, in Boyer et al. U.S. patent application Ser. No. 08/938,028, filed Sep. 18, 1997, which is hereby incorporated by reference herein in its entirety.

Some media distribution systems, such as television networks, begin or end programs at times that are slightly off from published start or end times of the programs. One television network may, for example, consistently start and/or end a program or programs at three minutes before their scheduled times. Still others may start and/or end programs at their scheduled times. In many instances, users may not have a way of knowing when a program actually starts or ends. When users schedule their VCRs, PVRs, or other recording systems, whether directly or via an interactive program guide, to record programs according to the published start and end times, the beginning or ending of the programs may be cut off. This may frustrate users, especially when the last minute of a program contains content that a user has been waiting for.

Television programs or other media may start at unscheduled times when, for example, a real-time event, such as a sporting event, runs late. Users recording the sporting event, that is unpredictably running later than the published scheduled time to end (e.g., as a result of overtime in a sporting event), may experience an early cut-off in the recording of that event. Furthermore, if the user has cued a program, scheduled to follow the sporting event that is unpredictably running past its scheduled end time, he or she may obtain an inappropriate recording of the adjacent event. One approach has been to allow users to specify padding to account for such variation in start times and end times when recording programs. For instance, REPLAY may incorporate a feature that allows users to manually set padding. This approach is deficient, however, in that the user is burdened with scheduling the amount of padding and the recording medium is wasted on unwanted content if the padding, or a portion of the padding, is not used for recording the desired program. Such an approach is also inappropriate for situations where time changes in published times may vary from network to network and from program to program. If users cannot remember the right amount of padding that is required, they must either waste recording time or chance a cut-off by estimating too little.

In view of the foregoing, it is an object of the invention to provide systems and methods for cut-off reduction when recording media distributed at imprecise intervals.

SUMMARY OF THE INVENTION

This and other objects of the invention are accomplished in accordance with the principles of the present invention by providing media recording systems that may determine time changes in the distribution of media. A media recording system is provided, such as an interactive program guide system with a storage device, a PVR system, an intelligent VCR, any other suitable system, or a combination thereof, that may track time changes used by media distributors to delay the start and/or extend the end times of media events from their scheduled start and/or end times.

The recording system may be used to record television programs, audio programs, promotional material, or any other suitable media that is distributed according to a schedule, using any suitable distribution scheme (e.g., radio-frequency, cable, satellite, Internet, etc.). The system may, for example, provide users with an opportunity to specify increments in seconds or minutes (e.g., in one minute increments) for the early or late recording of a desired media event. Users may determine how to set such increments by channel, network, media provider, by title, or using any other suitable criteria. The system may monitor a real-time data stream for an identifier or any other cue that indicates media is starting or is about to start or ending or about to end or just ended. For example, data in a vertical blanking interval (VBI) on a channel may be monitored to inform the system of a particular media that is about to begin. The recording of media may be performed by the user's equipment or by a server that is remote to the user's home.

If desired, data associated with media may be provided to the recording system. The associated data, such as program listings data for an interactive program guide, may be provided along with the media that is to be recorded or separate from the media using any suitable approach (e.g., using a continuous stream, using periodic communicating, using a client/server based approach, using any other suitable approach, or a combination thereof). The associated data may indicate a time change (e.g., a specific time delay or extension) desired by media providers for airing of the media. The time delay or extension may be specified by the media providers ahead of time, or may be predicted by the data provider based on past occurrences of time changes. Time delays and extensions may be entered in real-time/near-real-time by the data provider or others, or may be recognized automatically based on cues in the media. The recording system may automatically adjust or allow the user to adjust recording times for programs based on this time delay and extension information.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 9 is a diagram of an illustrative recording directory display screen that provides users with access to various program guide features in accordance with the present invention;

DETAILED DESCRIPTION OF THE INVENTION

Figure 1:
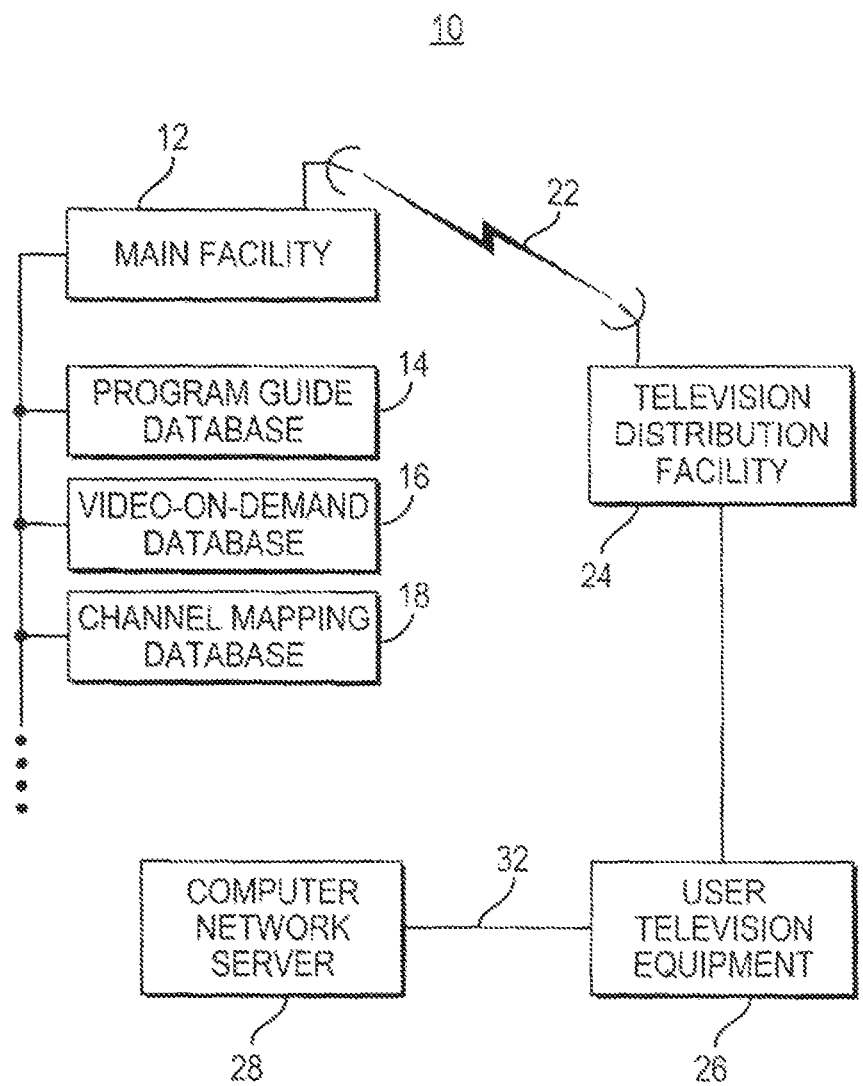
FIG. 1 is an illustrative schematic block diagram of an interactive television system in accordance with one embodiment of the present invention.

An illustrative system 10 in accordance with the principles of the present invention is shown in FIG. 1. Media may be distributed from one or more main facilities 12 to television distribution facility 24 and ultimately to user television equipment 26. Distributed media may be recorded with equipment that is implemented at least partially on user television equipment 26 or at least partially at a server (discussed further in FIG. 2) that is remote to user television equipment 26. Media that is to be recorded may be any suitable audio and/or video media, such as, for example, television programs, pay-per-view programs, video-on-demand (VOD) programs, music, promotional material, and any other type of media which is typically distributed to viewers over wired and wireless networks. For the purpose of clarity, and not by way of limitation, the media recording systems, techniques, or methods that are discussed herein are discussed primarily in the context of recording programs for programming. Data for the recording system may be provided by data distribution systems that may provide data separate from networks or systems that distribute media. Other suitable distribution schemes, such as schemes involving data transmission over the Internet or the like may also be used. If desired, the recording of programming may be implemented using a client-server architecture in which the operations of detecting programs and recording programs may be provided partly by a server (e.g., a server at television distribution facility 24 or at main facility 12) and partly by user television equipment 26.

Main facility 12 may include a program guide database 14 for storing program guide information (e.g., television program listings data, program-related information, channel listings data, channel-related information, network listings data, network-related information, package listings data, package-related information, pay-per-view ordering information, television program promotional information, program guide Internet-related information, etc.), video-on-demand (VOD) database 16, channel mapping database 18, or any other applicable databases. Multiple main facilities 12 may provide data to television distribution facility 24. Only one main facility has been shown to avoid over-complicating the drawing. For example, one main facility may be dedicated for providing program guide information and another main facility may provide specific media information.

Main facility 12 may transmit information from program guide database 14 as well as any other information through communications link 22 to television distribution facility 24. In practice, main facility 12 may transmit information in parallel to multiple television distribution facilities. Only one television distribution facility has been shown to avoid over-complicating the drawing. In some embodiments, main facility 12 may transmit information to other types of distribution facilities such as Internet servers for websites or a separate program guide distribution facility such as a wireless distribution facility.

Communications link 22 may be a satellite link, a telephone network link, an Internet link, a fiber-optic link, another suitable communications link, or a combination of such communications links. Any suitable program content may be transmitted by main facility 12 over communications link 22. Dependent on the type of program to be transmitted, appropriate links that are more efficient may be established. For instance, if it is desired to transmit video signals over communications link 22, a relatively high bandwidth link such as a satellite link may be preferable to a link that has a relatively low bandwidth. Television distribution facility 24 may be any facility suitable for distributing television programs to viewers, such as a cable system headend, a broadcast distribution facility, or a satellite television distribution facility.

Television distribution facility 24 may distribute information received from main facilities, such as one or more main facilities 12, to user television equipment 26 via communications path 30. User television equipment 26 may be any suitable television equipment that contains sufficient processing capabilities to implement advanced program recording methods and features in accordance with the present invention.

Communications path 30 may be a cable link, fiber-optic link, satellite link, broadcast link, another suitable link, or a combination of such links. Any suitable communications scheme may be used to transmit data over communications path 30, including in-band transmissions, out-of-band transmissions, digital transmissions, analog transmissions, cable transmissions, satellite transmissions, over-the-air transmissions, multi-channel multi-point distribution services (MMDS) transmissions, data-over-cable service interface specification (DOCSIS) transmissions, or any other suitable communications scheme. There are typically multiple associated communications paths 30. Only one communications path 30 is shown to avoid over-complicating the drawings.

Communications path 30 preferably has sufficient bandwidth to allow television distribution facility 24 to distribute television programming, program guide information, VOD and NVOD information, and other information to user television equipment 26. Multiple television and audio channels (analog, digital, or both analog and digital) may be provided to user television equipment 26 via communications paths 30. If desired, some of the data may be distributed to user television equipment 26 by one or more distribution facilities that are separate from television distribution facility 24 using communications paths that are partly or completely separate from communications path 30.

The data distribution technique used to distribute data on communications path 30 may depend on the type of information that is being distributed. For example, text and graphics may be distributed over an out-of-band channel using an out-of-band modulator or distributed in the vertical blanking interval (VBI) lines of an analog video channel. Video information may also be distributed in this way, although large quantities of video information may be more efficiently distributed using one or more digital channels on communications path 30. Such digital channels may also be used for distributing text and graphics.

Programming information from computer network server 28 may also be transmitted to user television equipment 26 via a communications path 32. Communications path 32 may be a dial-up telephone line, cable link, fiber-optic link, satellite link, broadcast link, another suitable link, or a combination of such links. In some embodiments, computer network server 28 may be connected to main facility 12 via a communications path suitable for exchanging program guide information, video-on-demand information, or other information with main facility 12.

Figure 2:
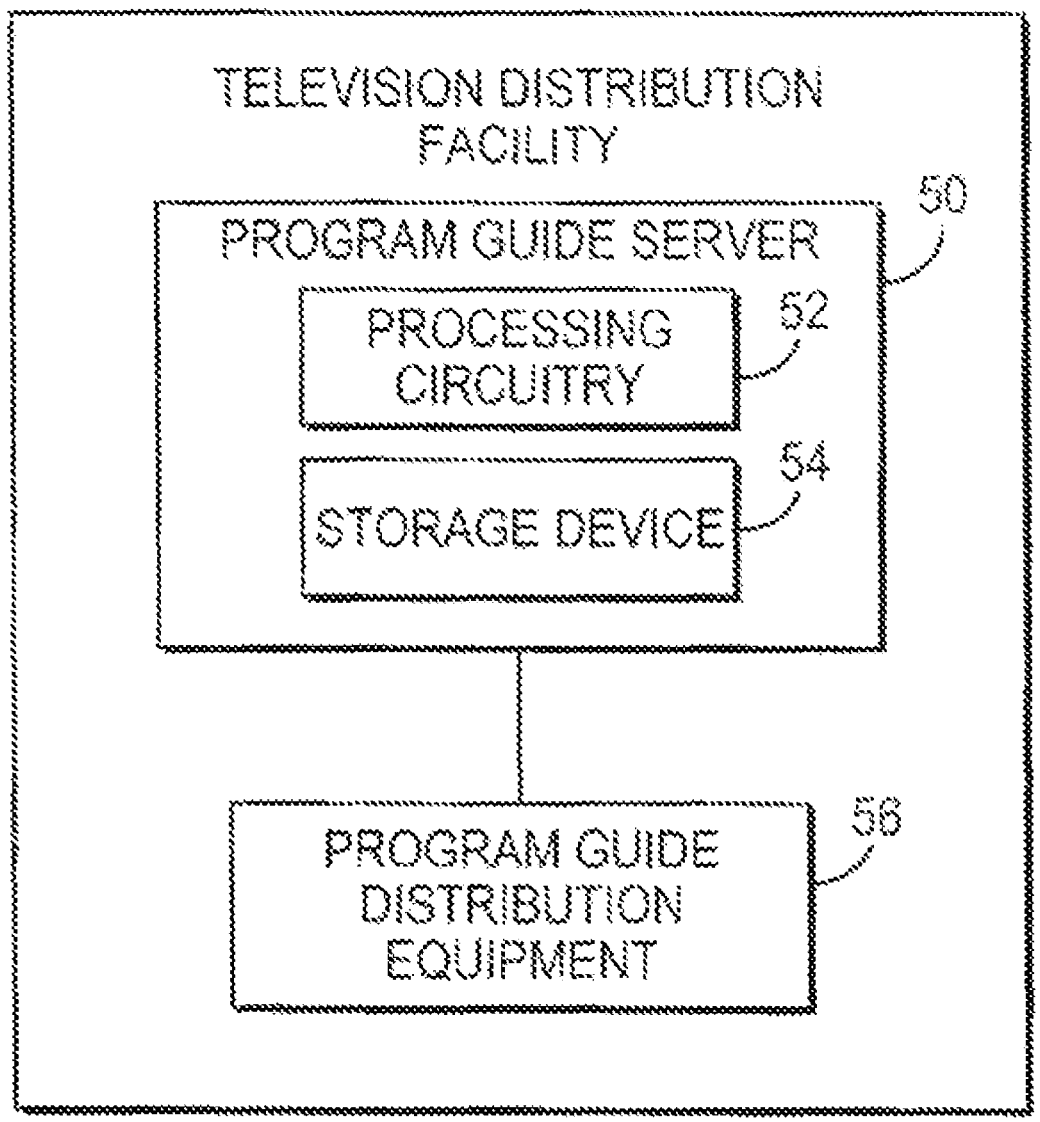
FIG. 2 is an illustrative schematic block diagram of television distribution facility of FIG. 1 in accordance with one embodiment of the present invention.

A client-server based interactive television program guide may be implemented on television distribution facility 24 (FIG. 1). FIG. 2 shows an illustrative arrangement for television distribution facility 24 in which a program guide server may obtain program guide data directly from main facility 12.

Television distribution facility 24 may have program guide distribution equipment 56 and program guide server 50. Distribution equipment 56 is equipment that is suitable for providing program guide data from program guide server 50 to user television equipment 26 over communications path 30. Distribution equipment 56 may include, for example, suitable transmission hardware for distributing program guide data on a television channel sideband, in the VBI of a television channel, using an in-band digital signal, using an out-of-band digital signal, over a dedicated computer network or Internet link, or by any other data transmission technique suitable for the type of communications path 30. Analog or digital video signals (e.g., television programs) may also be distributed by distribution equipment 56 to user television equipment 26 over communications paths 30 on multiple analog or digital television channels. Alternatively, videos may be distributed to user television equipment 26 from some other suitable distribution facility, such as a cable system headend, a broadcast distribution facility, a satellite television distribution facility, or any other suitable type of television distribution facility. If desired, television programming and program guide data may be provided over separate communications paths and/or from separate distribution facilities.

Program guide server 50 may be based on any suitable combination of server software and hardware. Program guide server 50 may retrieve program guide data or video files from storage device 54 in response to program guide data or video requests generated by an interactive television program guide client implemented on user television equipment 26. As shown in FIG. 2 program guide server 50 may include processing circuitry 52 and storage device 54. Processing circuitry 52 may include any suitable processor, such as a microprocessor or group of microprocessors, and other processing circuitry such as caching circuitry, video decoding circuitry, direct memory access (DMA) circuitry, input/output (I/O) circuitry, etc.

Storage device 54 may be a memory or other storage device, such as random access memory (RAM), flash memory, a hard disk drive, etc., that is suitable for storing the program guide data transmitted to television distribution facility 24 by main facility 12. User data, such as preferences, record and reminder settings, viewing histories and logs, and other suitable data may also be stored on storage device 54 by program guide server 50. Program guide data and user data may be stored on storage device 54 in any suitable format (e.g., a Structured Query Language (SQL) database). Storage 54 may also store various program files for on demand play back.

Processing circuitry 52 may process requests for program guide data by searching the program guide data stored on storage device 54 for the requested data, retrieving the data, and providing the retrieved data to distribution equipment 56 for distribution to user television equipment 26. Processing circuitry 52 may also process storage requests generated by the program guide client that direct program guide server 50 to store user data. Alternatively, program guide server 50 may distribute program guide data to and receive user data directly from user television equipment 26. If communications paths 30 include an Internet link, DOCSIS link, or other high speed computer network link (e.g., digital subscriber line (DSL), 10 BaseT, 100 BaseT, 10 BaseF, T1, T3, etc.), processing circuitry 52 may include circuitry suitable for transmitting program guide and user data and receiving program guide data and storage requests over such a link.

Program guide server 50 may communicate with user television equipment 26 using any suitable communications protocol. For example, program guide server 50 may use a communications protocol stack that includes transmission control protocol (TOP) and Internet protocol (IP) layers, sequenced packet exchange (SPX) and internetwork packet exchange (IPX) layers, Appletalk transaction protocol (ATP) and datagram delivery protocol (DDP) layers, DOCSIS, or any other suitable protocol or combination of protocols. User television equipment 26 may also include suitable hardware for communicating with program guide server 50 over communications paths 30 (e.g., Ethernet cards, digital modems, analog modems, cable modems, etc.)

A program guide client that is implemented on user television equipment 26 may retrieve program guide data from and store user data on program guide server 50 using any suitable client-server based approach. The program guide may, for example, pass SQL requests as messages to program guide server 50. In another suitable approach, the program guide may invoke remote procedures that reside on program guide server 50 using one or more remote procedure calls. Program guide server 50 may execute SQL statements for such invoked remote procedures. In still another suitable approach, client objects executed by the program guide may communicate with server objects executed by program guide server 50 using, for example, an object request broker (ORB). This may involve using, for example, Microsoft's Distributed Component Object Model (DCOM) approach. As used herein, "record requests" and "storage requests" are intended to encompass any of these types of inter-process or inter-object communications, or any other suitable type of inter-process or inter-object communication.

Figure 3:
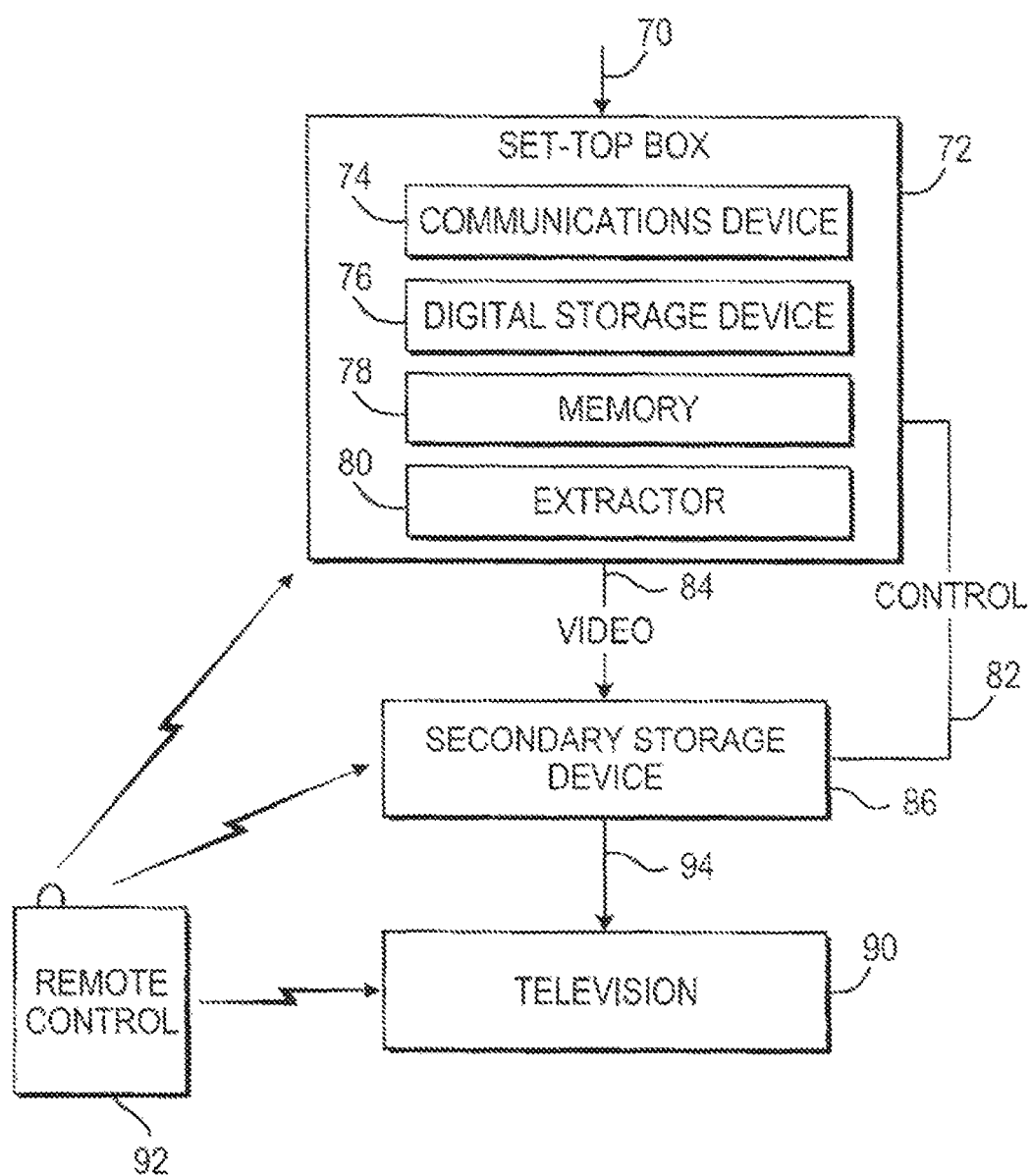
FIG. 3 is an illustrative schematic block diagram of user television equipment of FIG. 1 in accordance with one embodiment of the present invention.

An illustrative arrangement for user television equipment 26 is shown in FIG. 3. User television equipment 26 may receive television programming and data from television distribution facility 24 (FIG. 1), computer network server 28 (FIG. 1), some other system or distribution facility, or a combination thereof, at interface 70. During normal television viewing, a user may tune set-top box 72 to a desired television channel. The signal for that television channel may then be provided at video output 84 to a television 90. The signal supplied at output 84 may be a modulated signal on a predefined frequency channel (e.g., channel 3 or 4), an analog demodulated video signal, a digital signal provided on an appropriate digital bus (e.g., a bus using the Institute of Electrical and Electronics Engineers (IEEE) 1394 standard), or any other suitable signal. The video signal at output 84 may be received by secondary storage device 86.

Program recording features may be integrated on set-top box 72, on television 90 (if television 90 has suitable processing circuitry and memory), on a suitable analog or digital receiver connected to television 90, on secondary storage device 86, or on any other suitable device. Program recording features may also be cooperatively implemented on a suitable combination of these devices.

Secondary storage device 86 can be any suitable type of analog or digital storage device or player (e.g., a personal video recorder (PVR), an intelligent VCR, etc.). Program recording and other features may be controlled by set-top box 72 using control path 82. If secondary storage device 86 is a video cassette recorder, a typical control path 82 may, for example, involve the use of an infrared transmitter coupled to the infrared receiver in the videocassette recorder that normally accepts commands from a remote control such as a remote control 92. Remote control 92 may be used to control set-top box 72, secondary storage device 86, and television 90.

If desired, a user may record programs, application data or a combination thereof in digital form on an optional digital storage device 76. Digital storage device 76 may be a writeable optical storage device (such as a DVD player capable of handling recordable DVD discs), a magnetic storage device (such as a disk drive or digital tape), or any other digital storage device. For example, interactive television program guide systems that have digital storage devices are described in Hassell et al. U.S. patent application Ser. No. 09/157,256, filed Sep. 17, 1998, which is hereby incorporated by reference herein in its entirety.

Digital storage device 76 may be contained in set-top box 72 or may be external to set-top box 72 via an output port and appropriate interface. If necessary, processing circuitry in set-top box 72 may format the received video, audio and data signals into a digital file format. The file format may be an open file format such as the Moving Picture Experts Group (MPEG) MPEG-2 standard or the Moving Joint Photographic Experts Group (MJPEG) standard. The resulting data may be streamed to digital storage device 76 via an appropriate bus (e.g., a bus using the Institute of Electrical and Electronics Engineers (IEEE) 1394 standard), and then stored on digital storage device 76. In another suitable approach, an MPEG-2 data stream or series of files may be received from television distribution facility 24 (FIG. 1) and stored.

Television 26 may receive video signals from secondary storage device 86 via communications path 94. The video signals on communications path 94 may be generated by secondary storage device 86, may be generated by digital storage device 76 when playing back a recorded digital medium, may be passed through from set-top box 72, may be provided directly to television 90 from set-top box 72 if secondary storage device 86 is not included in user television equipment 90, or may be received directly by television 90. During normal television viewing, the video signals provided to television 90 correspond to the desired channel to which a user has tuned with set-top box 72. Video signals may also be provided to television 90 by set-top box 72 when set-top box 72 is used to play back information stored on digital storage device 76.

Set-top box 72 may have memory 78. Memory 78 may be any memory or other storage device, such as a random access memory (RAM), read only memory (ROM), flash memory, a hard disk drive, a combination of such devices, etc., that is suitable for storing instructions and/or data.

Set-top box 72 may have an extractor 80. Extractor 80 may be any hardware, software, or combination thereof suitable for extracting data from a real-time data stream (e.g., a vertical blanking interval "VBI" extractor). Similar components may be integrated into different hardware in user television equipment 26 if desired.

Set-top box 72 may include a communications device 74 for communicating with television distribution facility 24, computer network server 28, other facilities, or a combination thereof, via interfaces 70 over communications paths 30 and 32. Communications device 74 may be one or more modems (e.g., any suitable analog or digital standard, cellular, or cable modem), network interface cards (e.g., an Ethernet card, Token ring card, etc.), or other suitable communications devices. Television 90 and/or secondary storage device 86 may also incorporate such a suitable communications device if desired.

Figure 4:
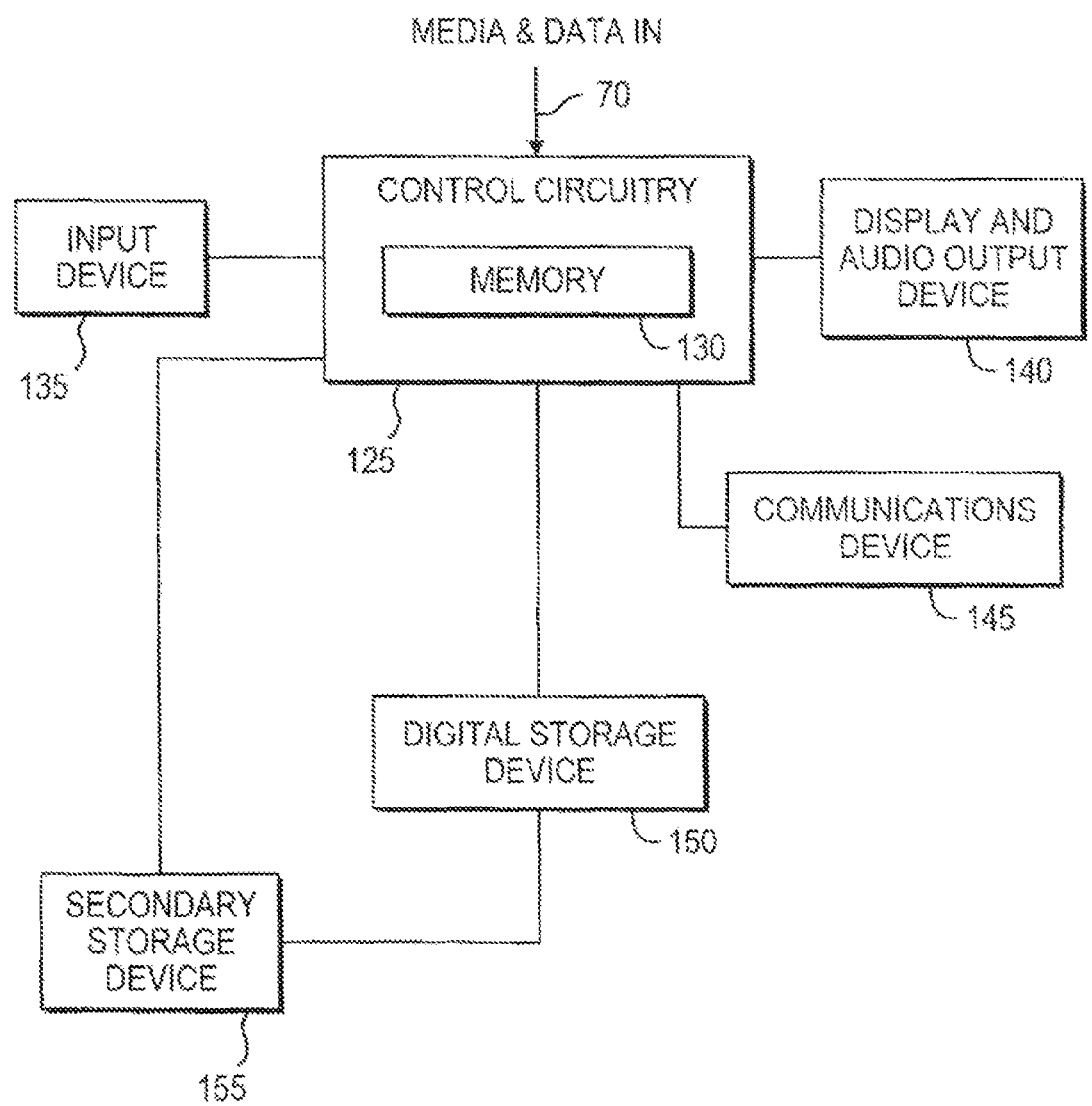
FIG. 4 is a more generalized illustrative schematic block diagram of user television equipment of FIG. 1 in accordance with one embodiment of the present invention.

A more generalized embodiment of user television equipment 26 of FIG. 3 is shown in FIG. 4. Data from television distribution facility 24 and other distribution facilities (e.g., program recording data, program guide data, etc.) is received by control circuitry 125 of user television equipment 26. For example, control circuitry 125 may include circuitry suitable for extracting in-band data from an analog channel as is indicated by extractor 80 in FIG. 3. Functions of control circuitry 125 may be provided using the set-top box arrangement of FIG. 3. Alternatively, these functions may be integrated into an advanced television receiver (e.g., a digital television receiver or high definition television (HDTV) receiver), personal computer television (PC/TV), or any other suitable arrangement. If desired, a combination of such arrangements may be used.

User television equipment 26 of FIG. 3 may have secondary storage device 155, digital storage device 150, or any suitable combination thereof for recording programs. Secondary storage device 155 and digital storage device 150 may be omitted if desired. Secondary storage device 155 can be any suitable type of analog or digital program storage device (e.g., a personal video recorder "PVR", an intelligent VCR, etc.). Program recording and other features may be controlled by control circuitry 125. Digital storage device 150 may be, for example, a writeable optical storage device (such as a DVD player capable of handling recordable DVD discs), a magnetic storage device (such as a disk drive or digital tape), or any other digital storage device.

User television equipment 26 may also include memory 130. Memory 130 may be any memory or other storage device, such as a random access memory (RAM), read only memory (ROM), flash memory, a hard disk, a combination of such devices, etc., that is suitable for storing instructions and data. For example, stored data may consist of program guide data, program recording instructions, or any other suitable data for use by control circuitry 125. Furthermore, memory 130 may be combined with or provided by digital storage device 150 or secondary storage device 155. Memory 130 may also be used for caching videos. Program recording instructions may, for example, be communicated to control circuitry 125, from secondary storage device 155, to instruct a remote server (e.g., program guide server 50 in FIG. 2) to delay or extend recording time. Communicated program recording instructions may be stored in memory 130.

User television equipment 26 may also include communications device 145 for supporting communications between user television equipment 26 and television distribution facility 24, computer network server 28, other suitable facilities, or a combination thereof, via interfaces 70 over communications paths 30 and 32. Communications device 145 may be one or more modems (e.g., any suitable analog or digital standard, cellular, or cable modem), network interface card (e.g., an Ethernet card, Token ring card, etc.), or other suitable communications device.

In some embodiments, user television equipment 26 may include multiple communications devices 145, which may be of different types. For example, one or more communications devices 145 may be an integrated cable modem for supporting Internet channels. One or more communications devices 145 may be receivers or tuners for in-band data paths. While user television equipment 26 is tuned to a television channel, data, which may be related or unrelated to the television channel, may be sent along with the audio and video of the channel. For analog television, the data may be sent in the video vertical-blanking interval (VBI). For digital television, the data may be sent as a separate digital data stream in the same analog carrier. One or more communications devices may be receivers for out-of-band data paths. For example, a receiver or tuner may be dedicated to continuously receiving out of band data from an out-of-band data channel. The channel may continuously provide data, regardless of the status of the other resources of user television equipment 26. One or more communications devices 145 may be modems for telephone dial-up links.

The user may control the operation of user television equipment 26 with user input device 135. User input device 135 may be a pointing device, wireless remote control, keyboard, touch-pad, voice recognition system, pen-based computer device or any other suitable user input device. To watch television, the user instructs control circuitry 125 to display a desired television channel on display and audio output device 140. To access the functions of the program guide, the user instructs the program guide implemented on user television equipment 26 to generate a main menu or other desired menu display screen for display on output device 140.

Figure 5:
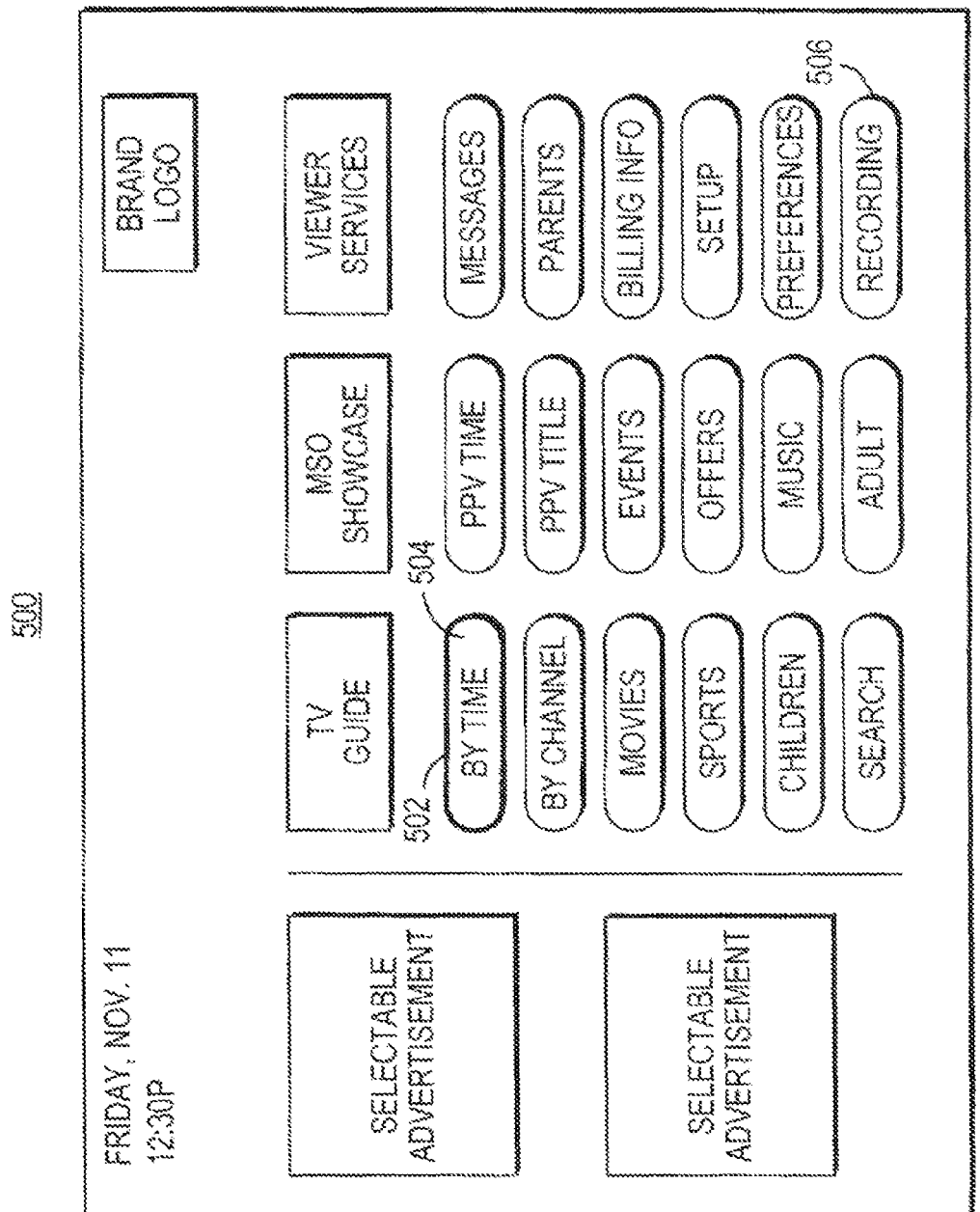
FIG. 5 is a diagram of an illustrative main menu display screen that provides access to various program guide features in accordance with the present invention.

When a user indicates a desire to access the interactive television program guide (e.g., by using a "MENU" key on remote control 92), the program guide may generate an appropriate program guide display screen on output device 140. Illustrative main menu display screen 500 of FIG. 5 may be provided to allow the user access to various program guide features. The interactive television program guide may provide the user with an opportunity to view television program listings. Program listings may be displayed, for example, by time, by channel, by category (e.g., movies, sports, children, etc.), or by titles, (e.g., listings that match a title text search). Program listings may be displayed using any suitable list, table, grid, or other display arrangement. The user may indicate a desire to view program listings by, for example, positioning a highlight region 502 over a desired program guide option 504 and pressing a key on the remote control such as an "OK", "Select", or "Enter" key. When the user indicates a desire to view television program listings, the program guide may obtain program listings data and generate an appropriate program listings display screen for display on output device 140. Program listings data may be provided through a data stream from a program guide server (e.g., program guide server 50 of FIG. 2), from memory (e.g., memory 130 of FIG. 4), or any other suitable source capable of providing program guide data. The program listings display screen may be an overlay or a full screen display. Listings may also be overlaid or otherwise placed on the same screen as the program (e.g., as used in a "browse" mode). Main menu screen 500 and any other display screens may also include selectable advertisements, brand logos, current date, current time, current channel identifier, reduced video of the currently tuned channel, or any other items related to the features of this invention.

Figure 6:
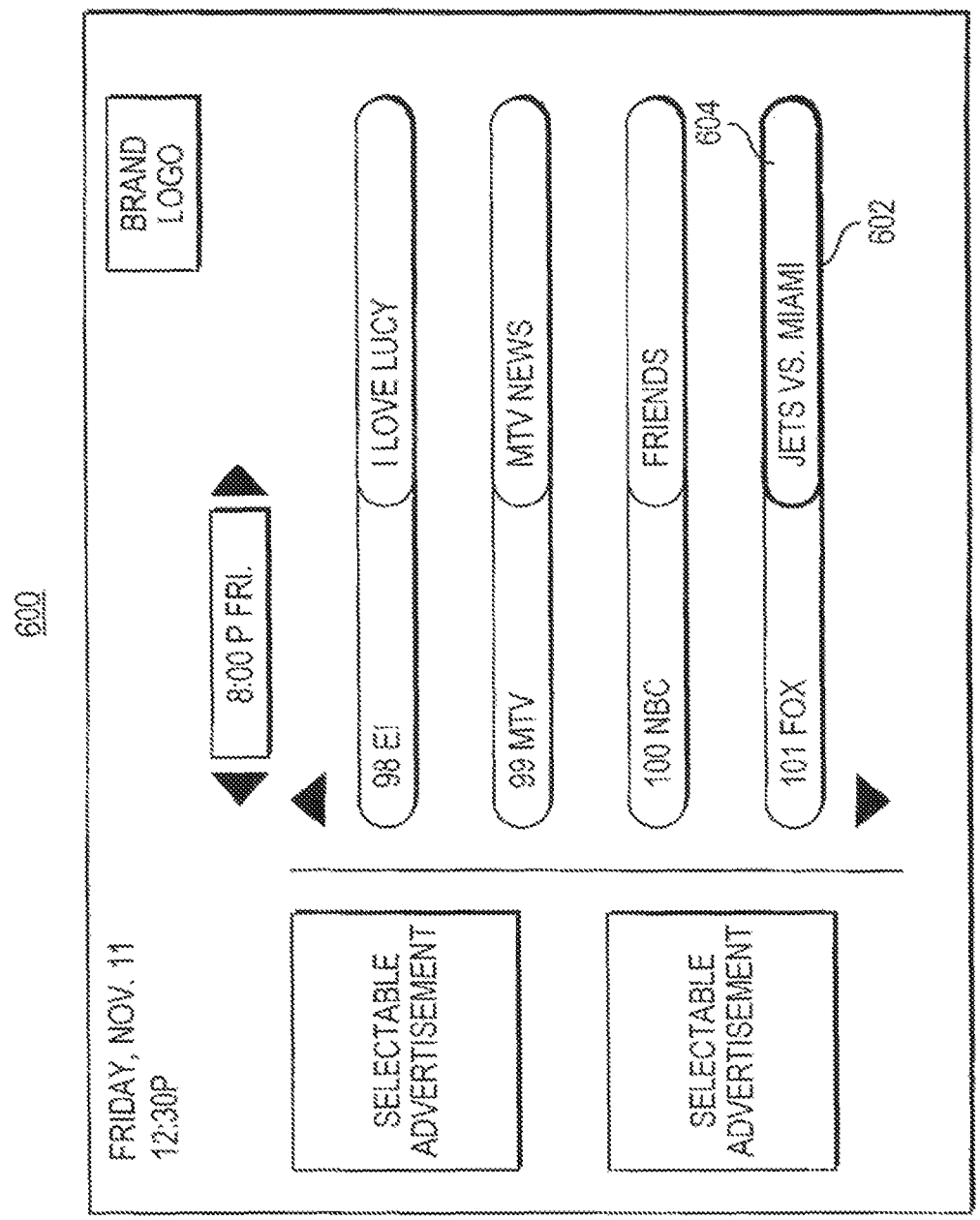
FIG. 6 is a diagram of an illustrative program listings display screen that provides users with access to various program guide features in accordance with the present invention.

FIG. 6 illustrates a display screen 600 of program listings that are displayed by time. Program listings display screen 600 may include highlight region 602, which may be used to highlight program listing 604. The user may position highlight region 602 by entering appropriate commands with a user input device (e.g., user input device 135 of FIG. 4). For example, if a user input device has a keypad, the user can move highlight region 602 using the up, down, left, and right arrow keys of the keypad. If desired, a touch sensitive screen, trackball, voice recognition device, pen-based computer device, or other suitable device may be used in moving highlight region 602 or may be used to select program listings without the use of highlight region 602. These methods of selecting program listings are merely illustrative. Any other suitable approach for selecting program listings, program guide options, or other items in the program guide may be used if desired.

An interactive television program guide may also provide the user with an option to select to have a program recorded. A user may position highlight region 602 over a desired program listing 604 and may use remote control 92 to select the highlighted program listing 604 (e.g., by using an "OK" key on remote control 92). When the program listing 604 is selected, information display screen 700 of FIG. 7 may be displayed to display program related options and a description of the selected program. For example, display screen 700 may include record option 702 along with other options (parental control option 704 and reminder option 706). Display screen 700 may also include cancel option 708 to provide the user with a way to exit information display screen 700 and choose another program listing of interest. In operation, the program guide may display information display screen 700 when a user selects a program listing such as the program listing "Jets vs. Miami" from program listings display screen 600. Information display screen 700 may include a detailed description of the selected "Jets vs. Miami" program along with user-selectable options 702, 704, 706, and 708. When the user selects record option 702, the program guide may select program listing 604 to be recorded.

Figure 8:
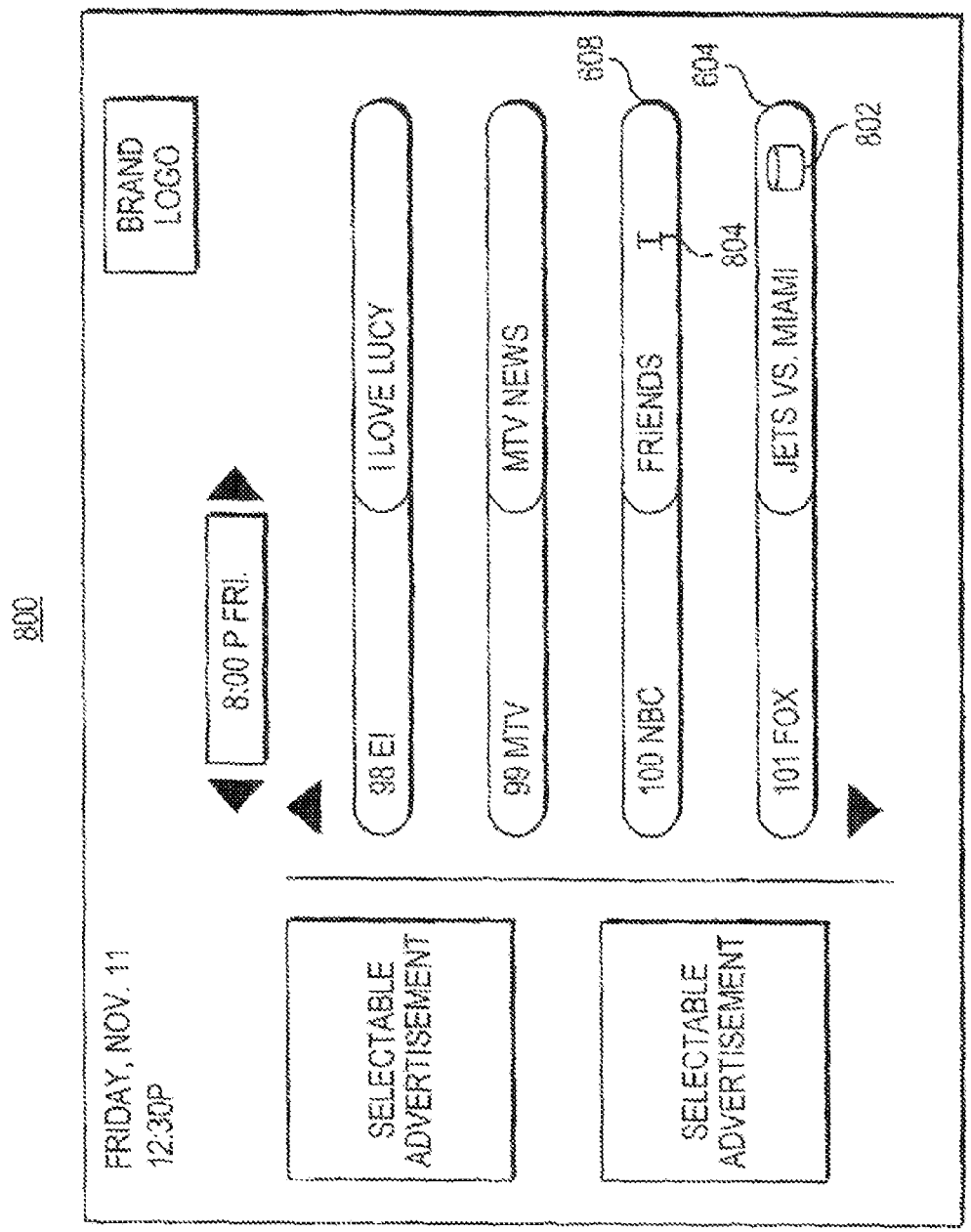
FIG. 8 is a diagram of another illustrative program listings display screen that provides users with access to various program guide features in accordance with the present invention.

With reference now to FIG. 8, if desired, icons may be displayed in program listing 604 to indicate actions associated with the program or to inform users of specific information. For example, programs selected for recording may be displayed in their normal position within the program listings with icon associated with the program that indicates that the program has been selected for recording. An icon may also be displayed in program listing 604 to indicate that time change information is available for that program listing. A time change may be a change to either the start time, end time, or both. The time change, which may also be referred to as a time delay and/or extension, may be either before or after a nominal time (e.g., a normal start time). Nominal start and end times are program times that are published in advance.

Illustrative display screen 800 of FIG. 8 shows, for example, a listing for a scheduled recording of "Jets vs. Miami" at 8:00 PM on Friday. Program listing 604 includes icon 802 that is displayed to indicate that the "Jets vs. Miami" program has been selected for recording. Listing 608 that is for a scheduled broadcast of "Friends" at 8:00 PM on Friday may include icon 804 that is displayed to indicate that time change information is available for that program. If desired, program listing 604 may also include an indication that time change information exists for the program that is selected for recording. The user may view time change information by, for example, accessing a recording directory display screen (listing recorded and pending program selection), selecting the pending selection indicating time change information, and selecting to view relevant recording information about the program such as time delay and/or extension information. Sample recording directory and recording information display screens will be discussed in further detail in FIGS. 9-11c. Time change information for a selected program may additionally be accessible through other means. In yet another embodiment, the availability of time change information for a program may not be indicated on the listing screen. For example, time change information may always be available, may never be available until air time, or may be available without the guide displaying an icon (e.g., icon 804). Other suitable approaches may be used to indicate that time change information is present or to indicate that a program has been selected to be recorded. For example, program listings may be displayed with different colors, fonts, shades or any other suitable effect.

The program guide may provide the user with an opportunity to view a directory of programs that have been selected for recording. FIG. 9 shows a recording directory display screen 900 that the program guide may display when, for example, the user selects recording option 506 from main menu display screen 500 of FIG. 5. Recording directory display screen 900 may provide the user with a list of programs selected for recording. For example, directory display screen 900 may provide the user with listings of recorded selections 902 and lists of pending selections 904. Listings of recorded selections 902 may be listings of selected programs that have been recorded and listings of pending selections 904 may be listings of programs that have been selected to be recorded. Display screen 1000 of FIG. 10 may be presented to the user when pending selection 906 from listings 904 is selected.

Figure 10:
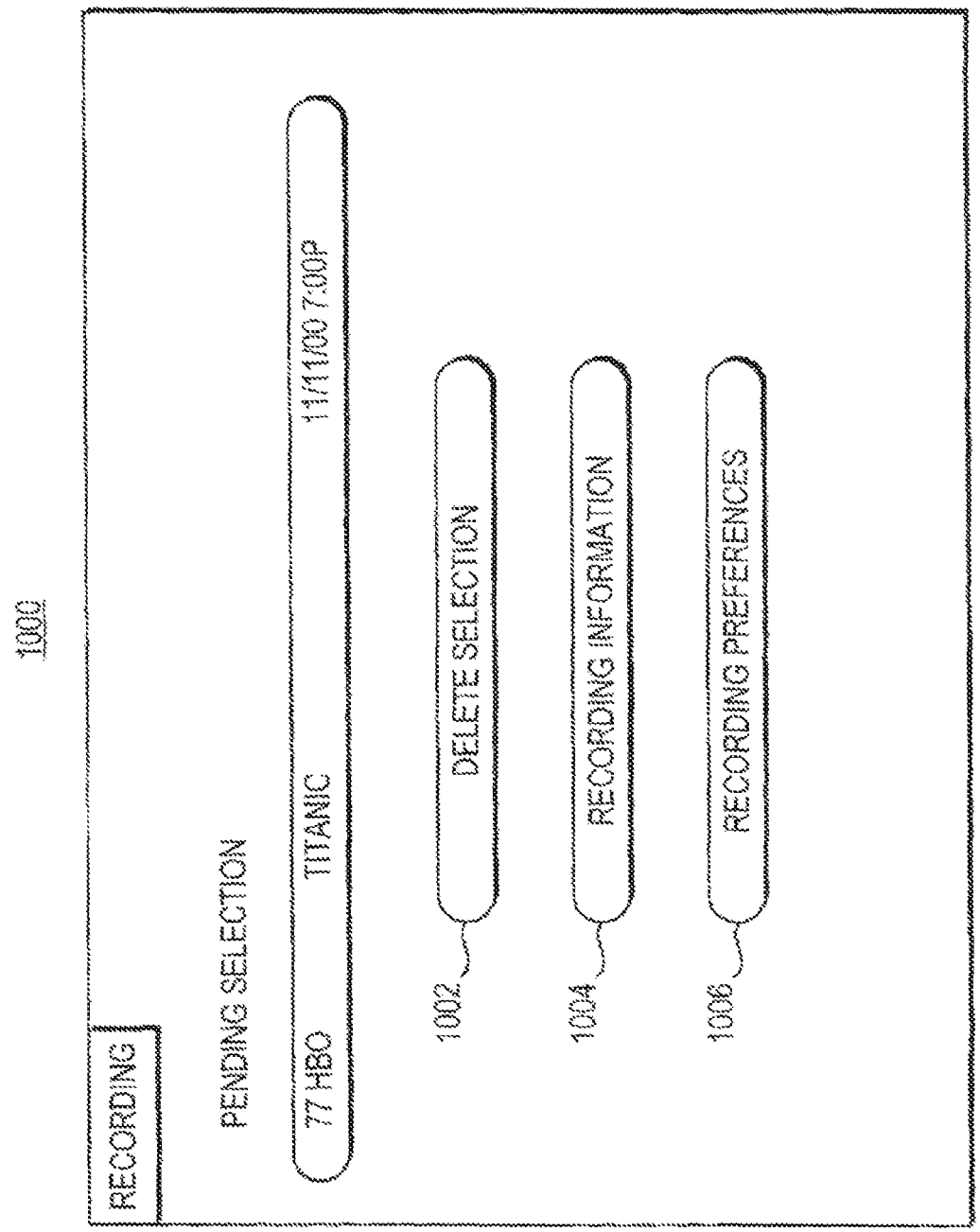
FIG. 10 is a diagram of an illustrative pending selection display screen that provides users with access to various program guide features in accordance with the present invention.

FIG. 10 illustrates pending selection display screen 1000. Display screen 1000 may provide the user with various options that are related to the pending program selected for recording. For example, display screen 1000 may include delete selection option 1002 for removing the program from the list of programs pending to be recorded, recording information option 1004 for receiving additional information about the selected program, or recording preferences option 1006 for specifying settings for recording the program. Additional options may be made available from display screen 1000.

Figure 11A:
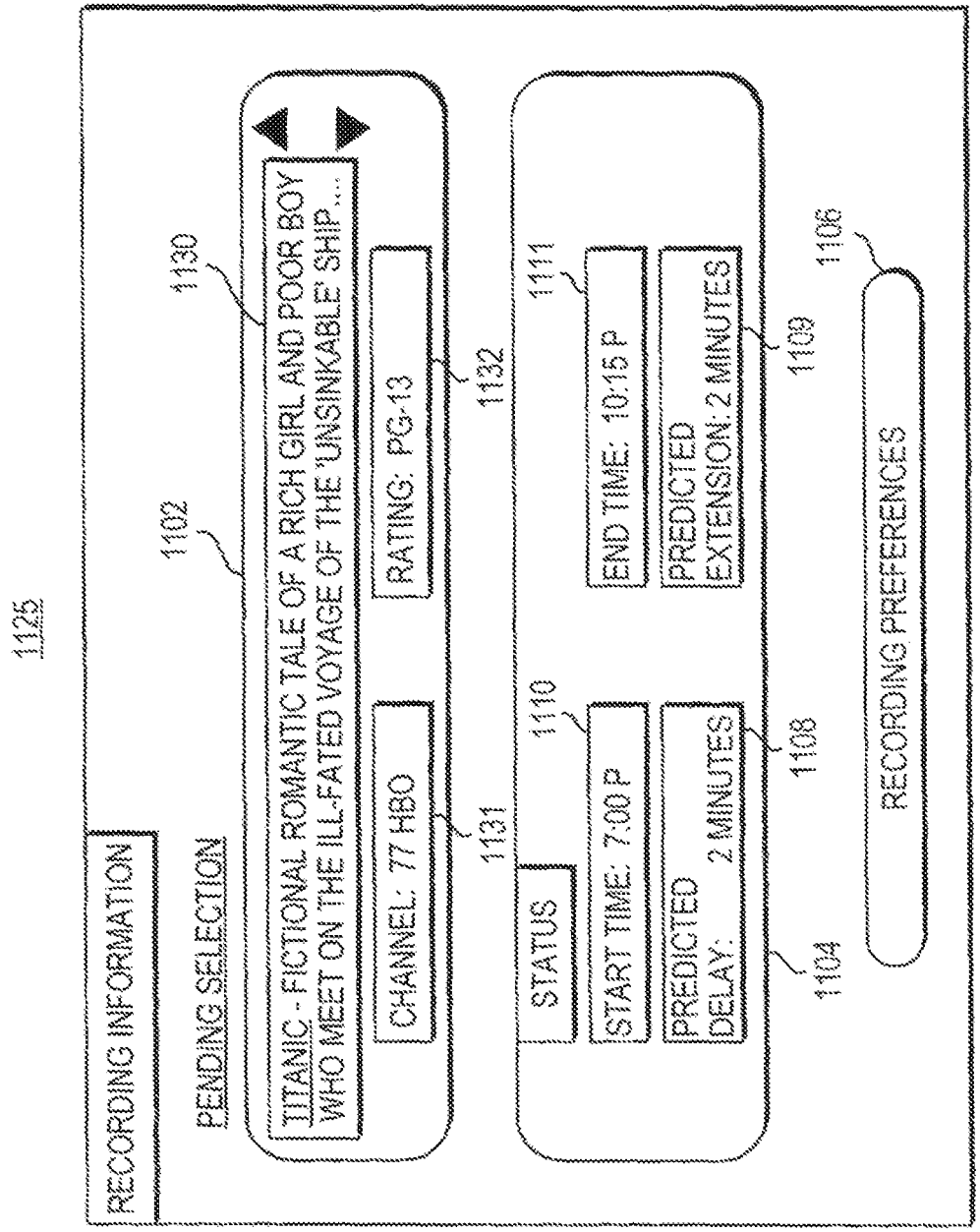
FIGS. 11a, 11b, and 11c are diagrams of illustrative recording information display screens that provide users with access to various program guide features in accordance with the present invention.
Figure 11B:
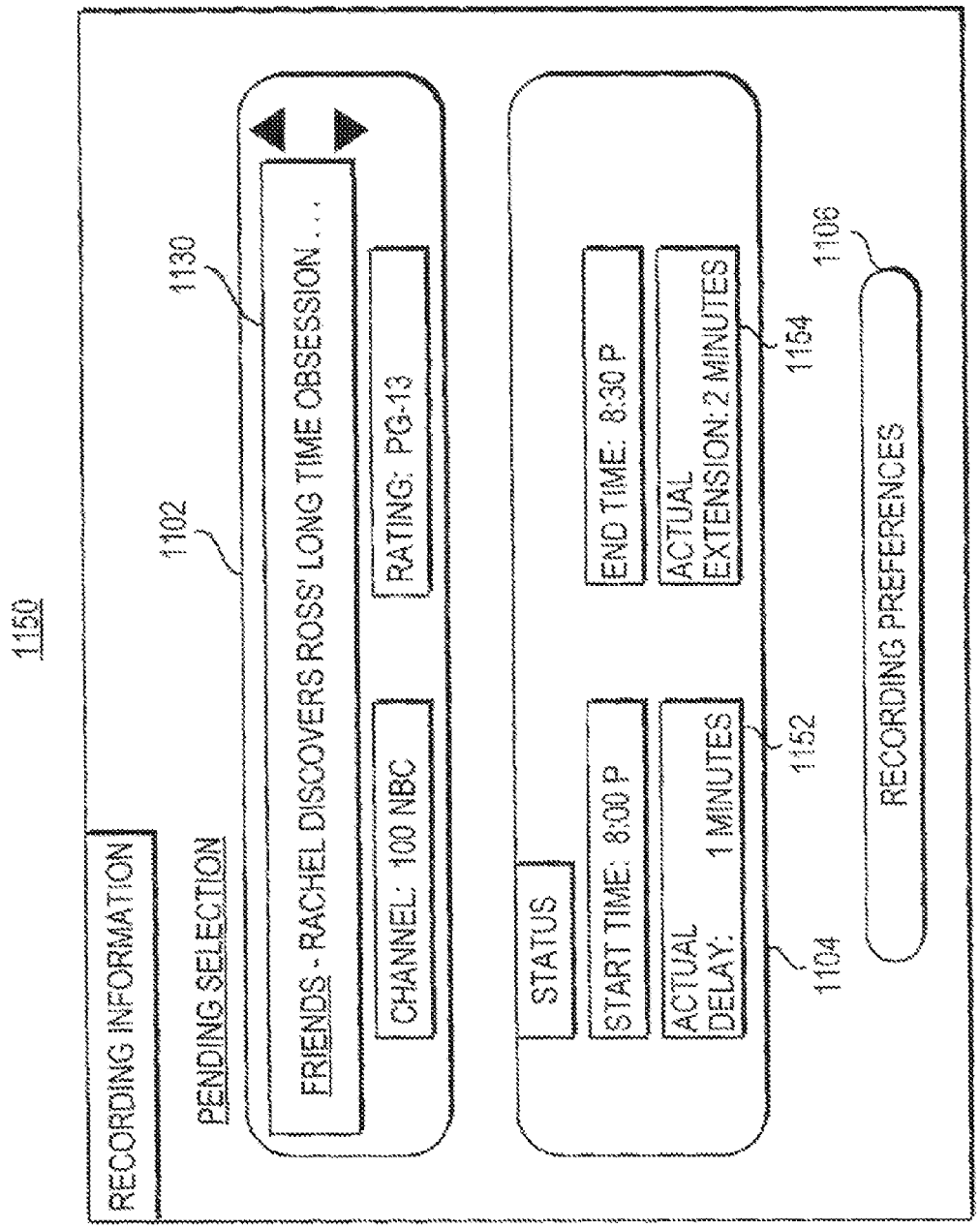
Figure 11C:
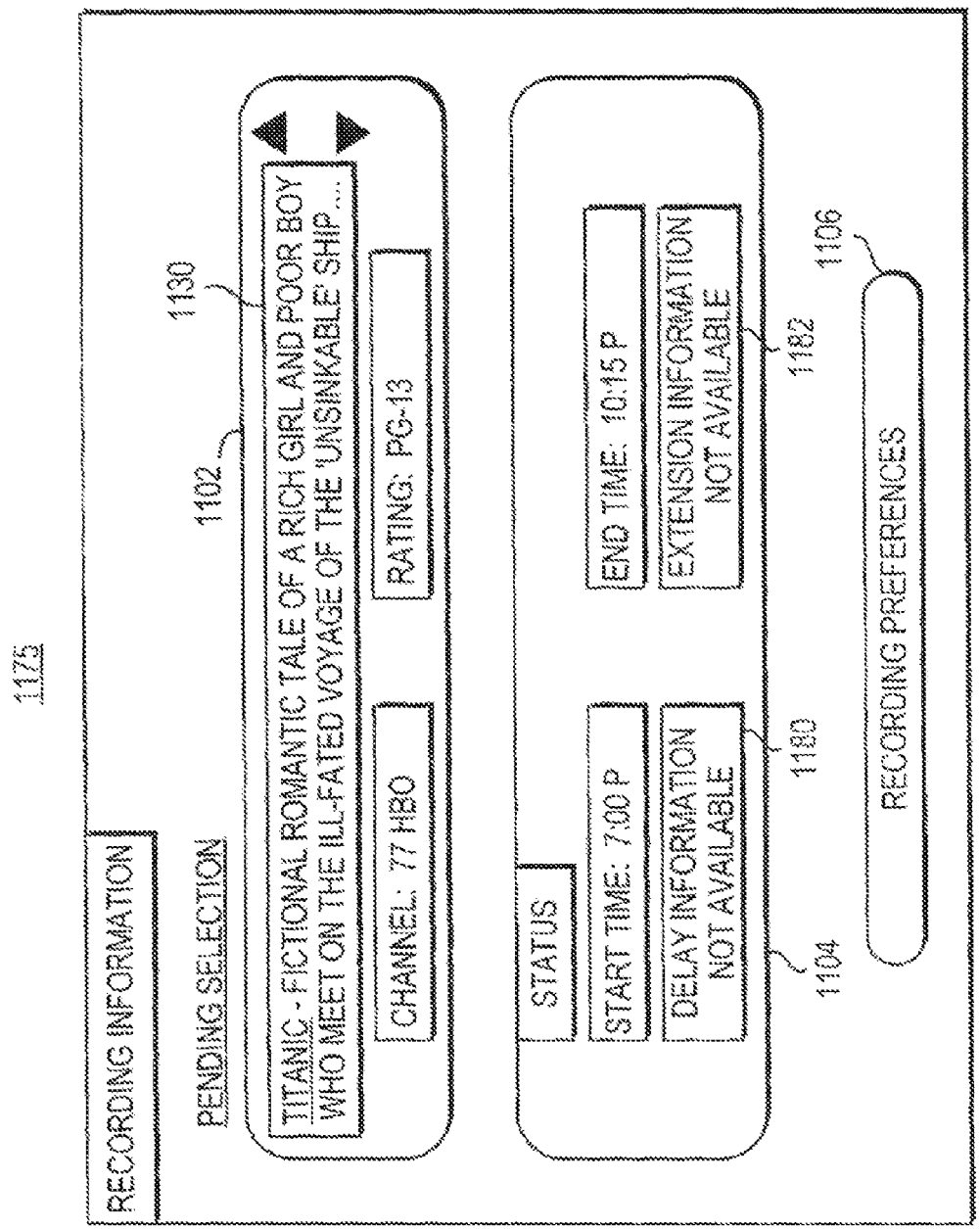

Program recording techniques may incorporate methods for tracking time changes that are used by distributors to delay the start or extend the end of real-time programs from their scheduled times. FIGS. 11a-11c illustrate recording information display screens that may provide users with information that is related to programs that are selected for recording. A user may select to view additional information about a program that is to be recorded. For example, a user may select recording information option 1004 of FIG. 10 to access recording information display screen 1125 of FIG. 11a. Display screen 1125 may provide the user with program information region 1102 and status region 1104. Region 1102 may include a program description in description region 1130, channel region 1131 including a channel identifier for channel on which the program is airing, and rating region 1132 to show a program rating. Additional regions may be incorporated in region 1102.

Data may be associated with a program that is to be recorded. Such data (e.g., program listings data) may be provided with programs or separate from programs to the recording system using any suitable approach. The associated data may be provided using a continuous data stream, a periodic data stream, client/server based data communications, any other suitable approach, or a combination thereof. The associated data, for example, may provide time change information. This information may be posted in region 1104. Region 1104 may provide the user with information pertaining to start times, end times, and delays and/or extensions in the times. Regions 1110 and 1111 may show the start time and end time, respectively, of a program. Region 1110 may post the nominal start time and region 1111 may post the nominal end time. Region 1104 may also post time change information.

Region 1104 may also post time change information. In one embodiment, time change information displayed in region 1104 may include a predicted time delay in predicted delay region 1108 and/or a predicted time extension in predicted extension region 1109. The predicted time delay and time extension may be provided by a program provider, a data provider (e.g., television distribution facility 24 in FIG. 2), or any other suitable provider based on past occurrences of time changes or any other suitable approach. A log may be maintained (e.g., using a storage device) of previous time changes. Using logs in predicting time changes are further discussed in connection with FIG. 14.

In another embodiment, time change information displayed in region 1104 may be actual time delay and/or extension information. FIG. 11b shows information display screen 1150. Region 1104, in display screen 1150, may indicate an actual time delay that is expected in actual delay region 1152 and/or an actual time extension in actual extension region 1154. The actual time delay and actual time extension may also be provided by the program provider, the data provider, or any other suitable provider. The actual time delay may be an actual delay that is expected in the start time of the program and the actual time extension may be an actual extension that is expected in the end time of the program by the program distributor.

Some recording systems (e.g., VCR's) may only be capable of recording one program at a time. Such systems may allow for adjacent programs to be recorded in which both programs may be recorded based on nominal start and end times. When this type of recording system experiences a time change in one of the programs, the adjacent recordings might overlap and cause cut-off in the recording of one or both of the adjacent programs. The program guide may help to reduce the cut-off of adjacent recordings by trimming the time delay and/or extension of one or both of the adjacent programs. For example, the program guide could base which program recording time to trim based on the confidence in the prediction of the time change. The confidence in the time changes may be determined by the number of samples collected to provide the predicted time change. In such systems, the program guide may automatically reduce cut-off in the recording of adjacent programs that overlap.

In another embodiment, if two adjacent recordings are detected on a recording system, only capable of recording one program at a time, preference may be given to the first adjacent program. The program guide may automatically trim the second of the two adjacent programs to maintain the ending of the first program. This may be preferred by users who would rather lose the beginning of a program than lose the end, or conclusion, of a program.

Figure 12A:
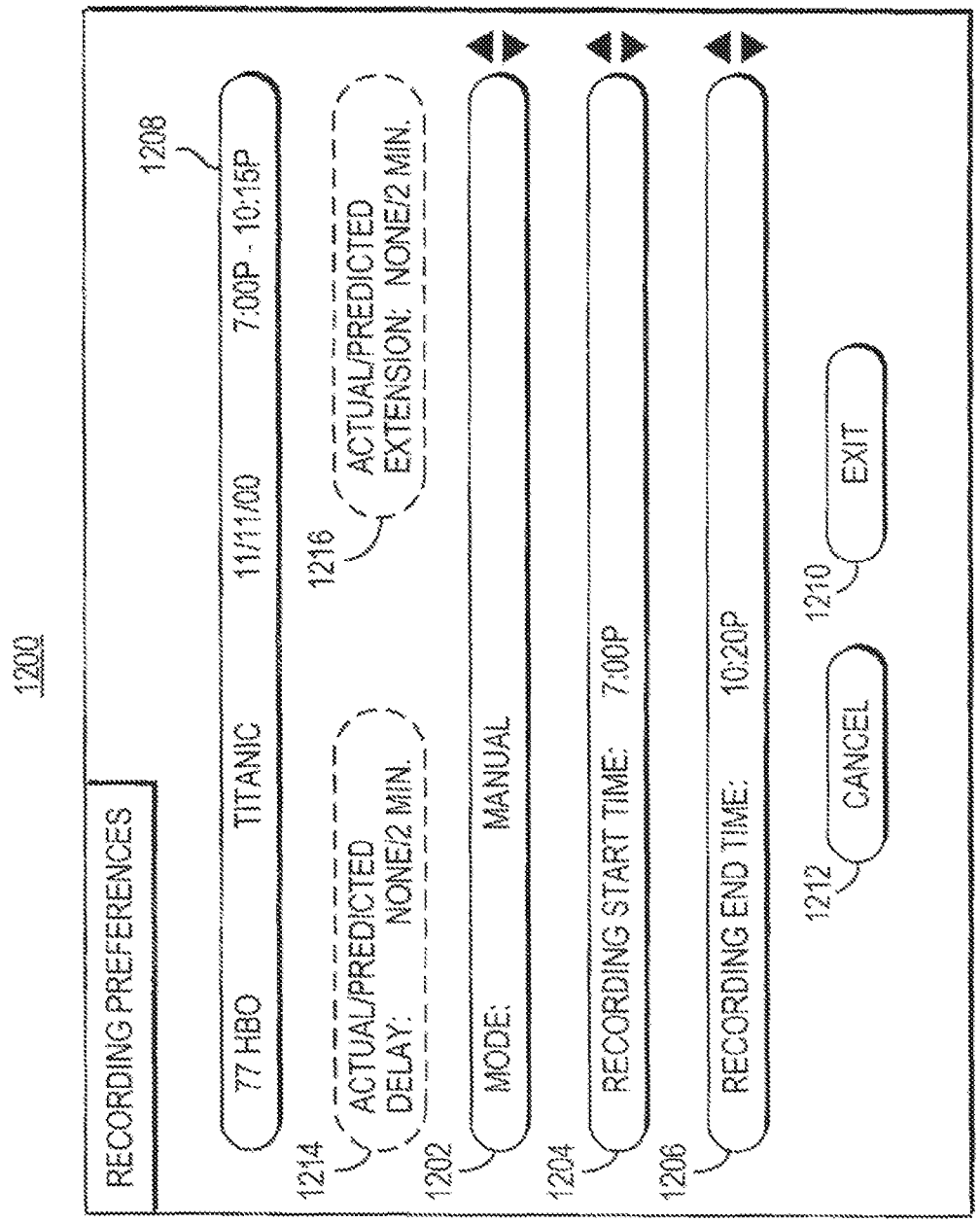
FIGS. 12a and 12b are diagrams of an illustrative recording preferences display screen that provides users with access to various program guide features in accordance with the present invention.
Figure 12B:
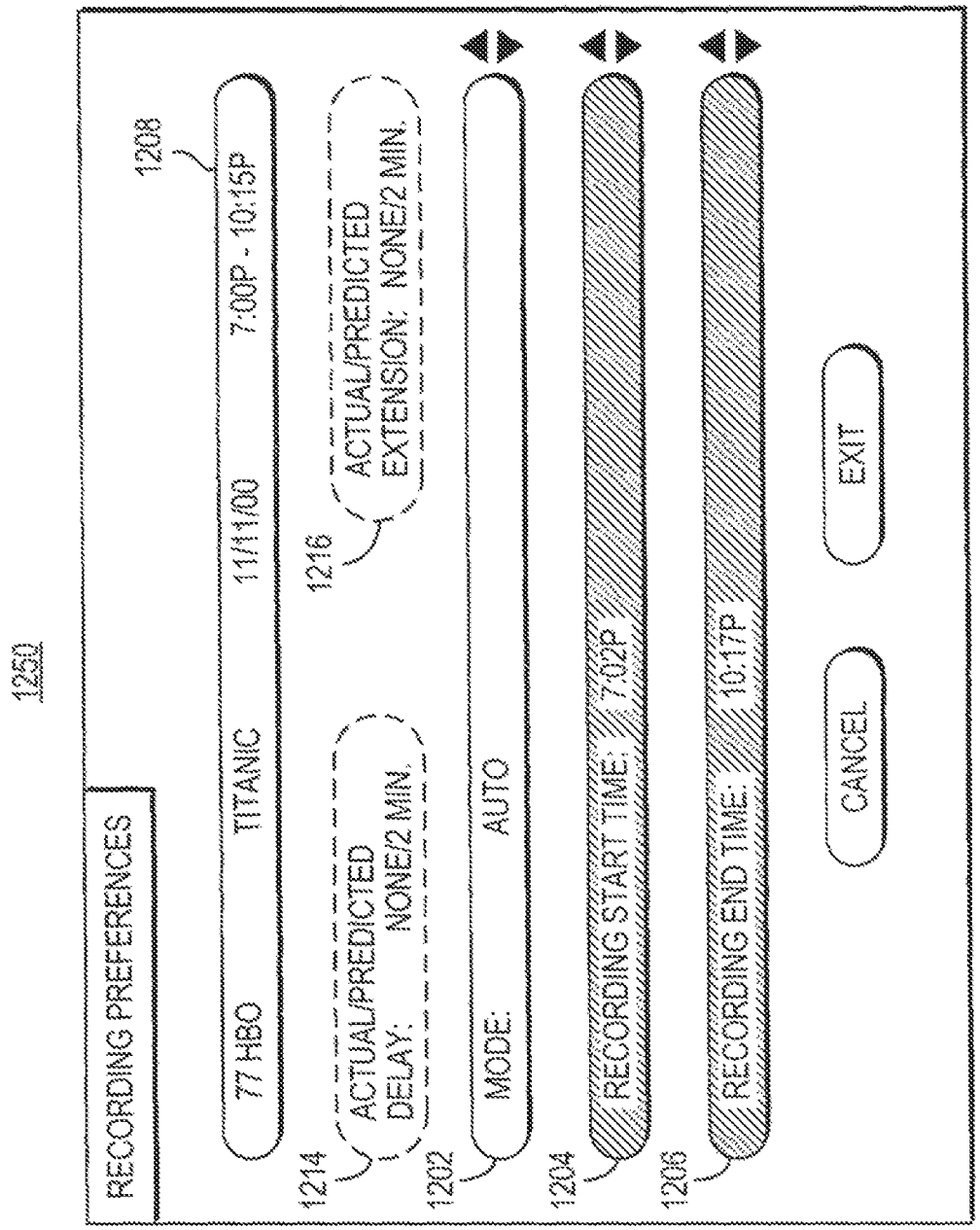

Time change information may not be available. If time change information is not available for a program selected for recording, recording related information region 1104 may post "Delay Information Not Available" in delay region 1180 and "Extension Information Not Available" in extension region 1182 as illustrated in display screen 1175 of FIG. 11c. Although, if time delay and/or extension information is available for a program selected for recording, the user may choose to adjust recording start and end times to compensate for the time changes. FIGS. 11a-11c provide the user with recording preferences option 1106. Recording preferences feature 1106 may provide the user with an opportunity to adjust recording times to compensate for predicted or actual time changes. FIGS. 12a and 12b show illustrative display screens 1200 and 1250, respectively, that illustrate functionality that may be provided to a user when option 1106 is selected.

Display screen 1200 of FIG. 12a provides the user with options for adjusting his or her recording preferences. Display screen 1200 may include program listing region 1208 for showing listing information for the program that is to be recorded and time change information regions 1214 and 1216 for posting the predicted or actual time delays and/or extensions, respectively. The user may also be provided with mode option 1202 for setting the operating mode of the recording system. The operating mode may allow the user to select between a manual mode or an automatic mode. If the user chooses to control recording times he or she may select "Manual" in mode option 1202. When this option is selected the user may be provided with an ability to specify how the start of a recording should be delayed and/or the end of a recording should be extended. In manual mode, recording start time option 1204 and recording end time option 1206 may be made available to the user. Option 1204 and option 1206 may, respectively, allow the user to specify how early and/or late the system should start and end recording the selected program. For example, in FIG. 11a, a predicted time delay and extension of two minutes is displayed in status region 1104 for the program "Titanic". Upon being informed of the time change for the program, the user may access display screen 1200 of FIG. 12*a*, using recording preferences option 1106 of FIG. 11*a*, and specify when the recording should start and end. When a user is satisfied with his or her adjustments, the user may save their selections by exiting display screen 1250 using exit option 1210. If the user decides to cancel recording of the selected program or to cancel selection mode in display screen 1200, the user may select cancel option 1212.

Figure 7:
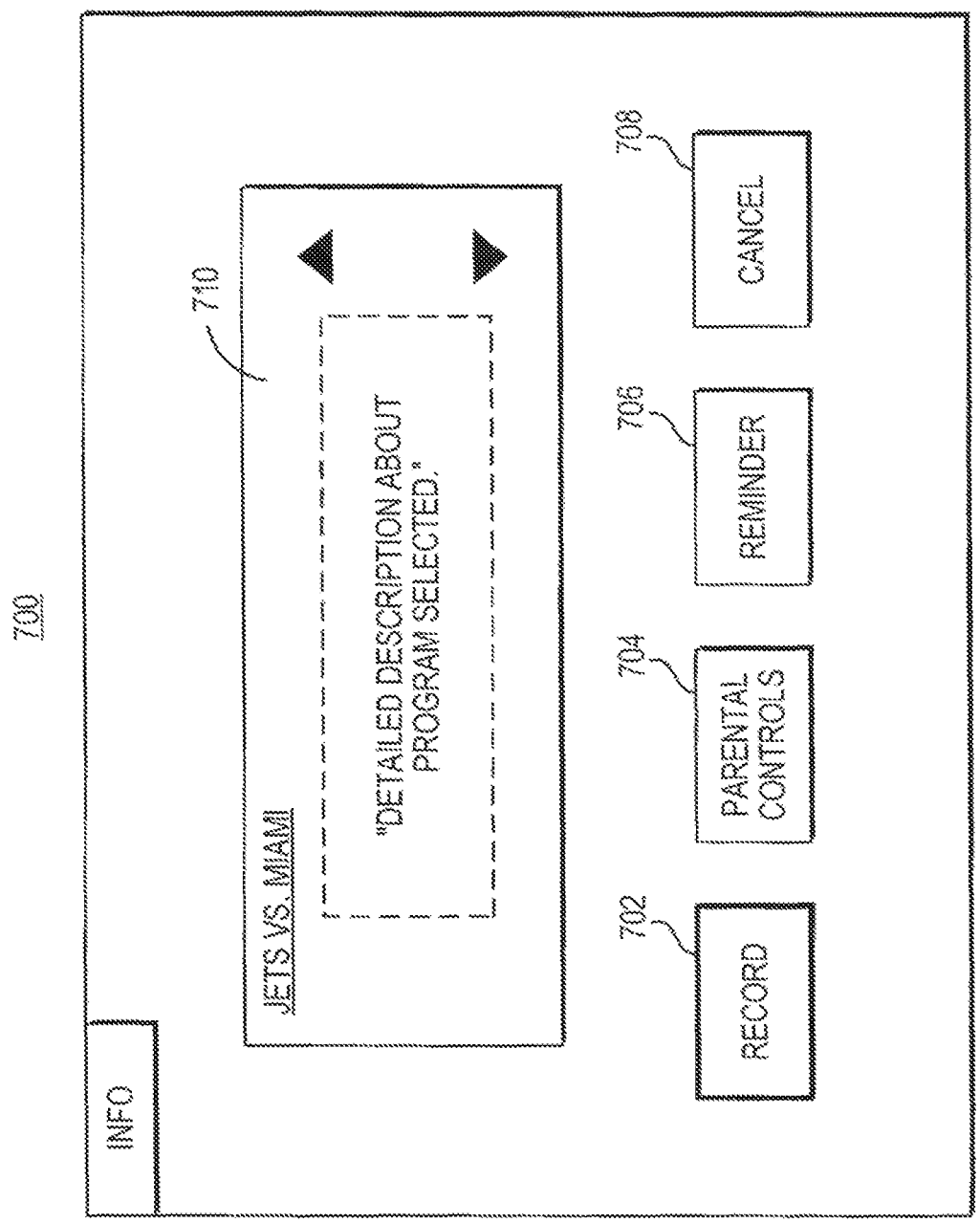
FIG. 7 is a diagram of an illustrative information display screen that provides users with access to various program guide features in accordance with the present invention.

If desired, when a user selects a program listing to be automatically recorded (e.g., by highlighting a listing and pressing a "Record" key on user input device 135, by selecting the record option from overlay 702 of FIG. 7, etc.), a single display screen may be displayed that includes the options and information that is shown, for example, in FIGS. 11*a* and 12*a* except for possibly recording preferences option 1006. The display screen will allow a user to view program related information, recording preferences, and time change information together. The list of programs to be recorded may be accessed through, for example, a main menu display screen.

In another embodiment, the recording system may be configured to automatically adjust to compensate for time changes. Display screen 1250 in FIG. 12*b* displays mode option 1202 which has been set to "Auto". If this mode is selected, the start and end times that are displayed in options 1204 and 1206 may be automatically set by the recording system to compensate for predicted or actual time changes. If desired, when in "Auto" mode, recording start time option 1204 and recording end time option 1206 may be shaded to indicate that these options are not currently available for selection by the user. For example, the predicted time delay and extension of two minutes posted in regions 1108 and 1109, respectively, may be automatically incorporated into the nominal start and end times by the recording system. As shown in FIG. 12*b*, the program "Titanic" has a nominal start time at 7:00 PM and a nominal end time at 10:15 PM. As a result of the predicted delay and the "Auto" mode, the recording system may automatically adjust option 1204 to start recording at 7:02 PM and option 1206 to end recording at 10:17 PM.

Display screens 1200 and 1250 are only provided for purposes of illustration and not by way of limitation. Additional time change options may be incorporated in the display screens. If there are actual and predicted time changes that are associated with a program that is selected to be recorded and the automatic mode is selected, the recording system may adjust start and end times based on whichever time change is longer. If desired, rather than selecting the longer time change, the recording system may have been configured to always select a particular one of the two types of time change information.

Figure 13:
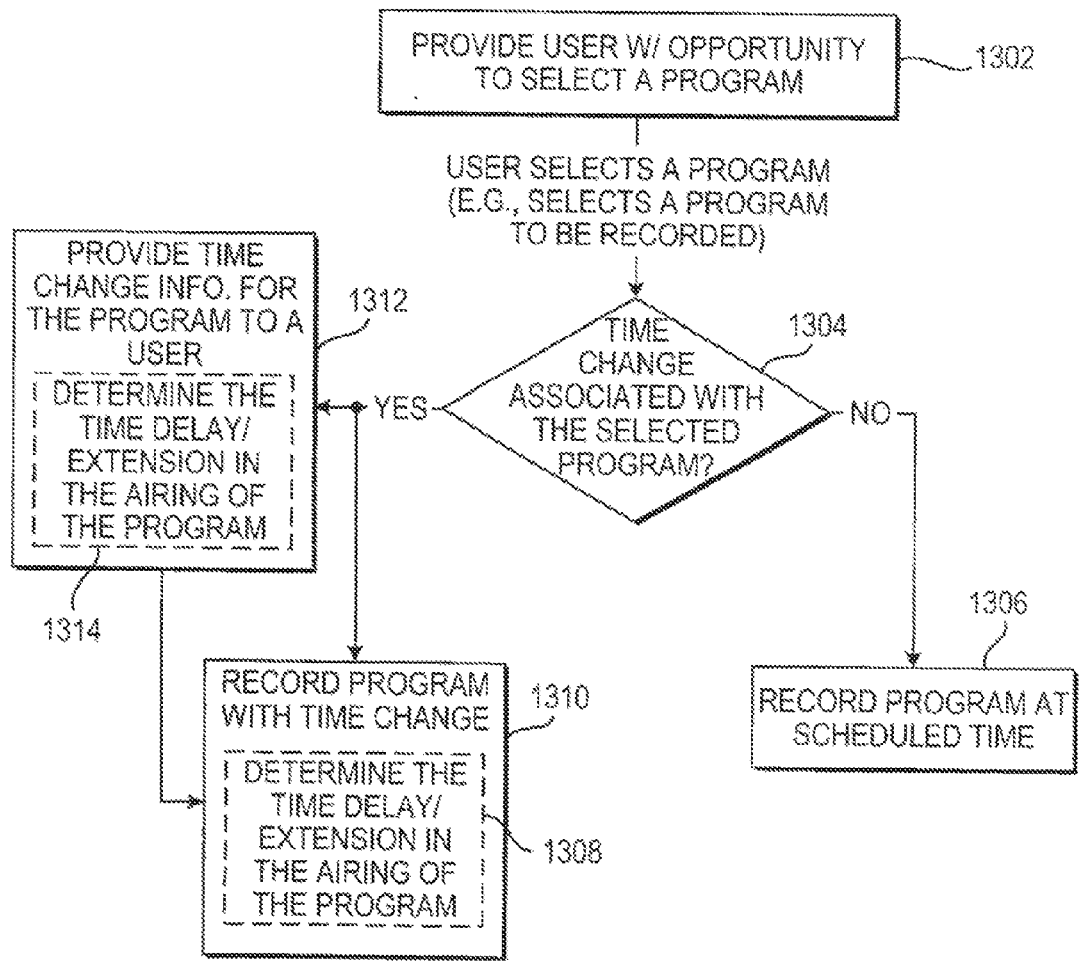
FIG. 13 is a flowchart of illustrative steps involved in associating time change data with media in accordance with an embodiment of the present invention.
Figure 14A:
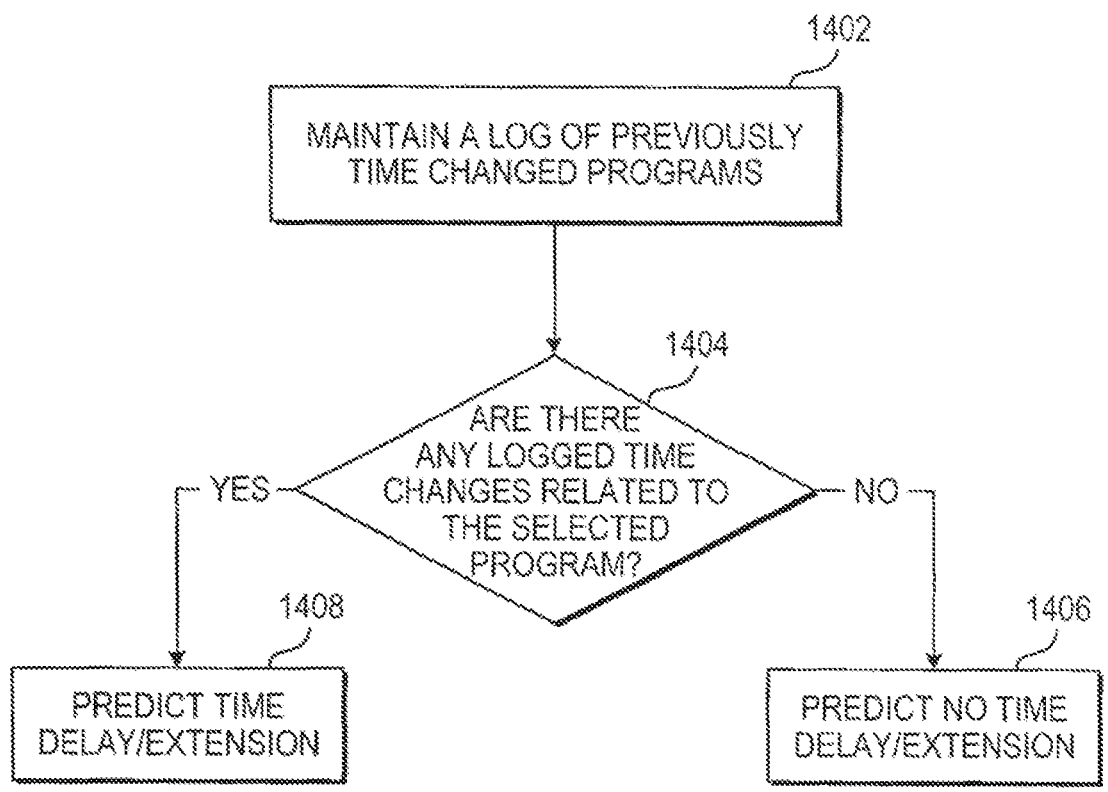
FIGS. 14a-14c are flowcharts of illustrative steps involved in recording with predicted time changes in accordance with an embodiment of the present invention.
Figure 14B:
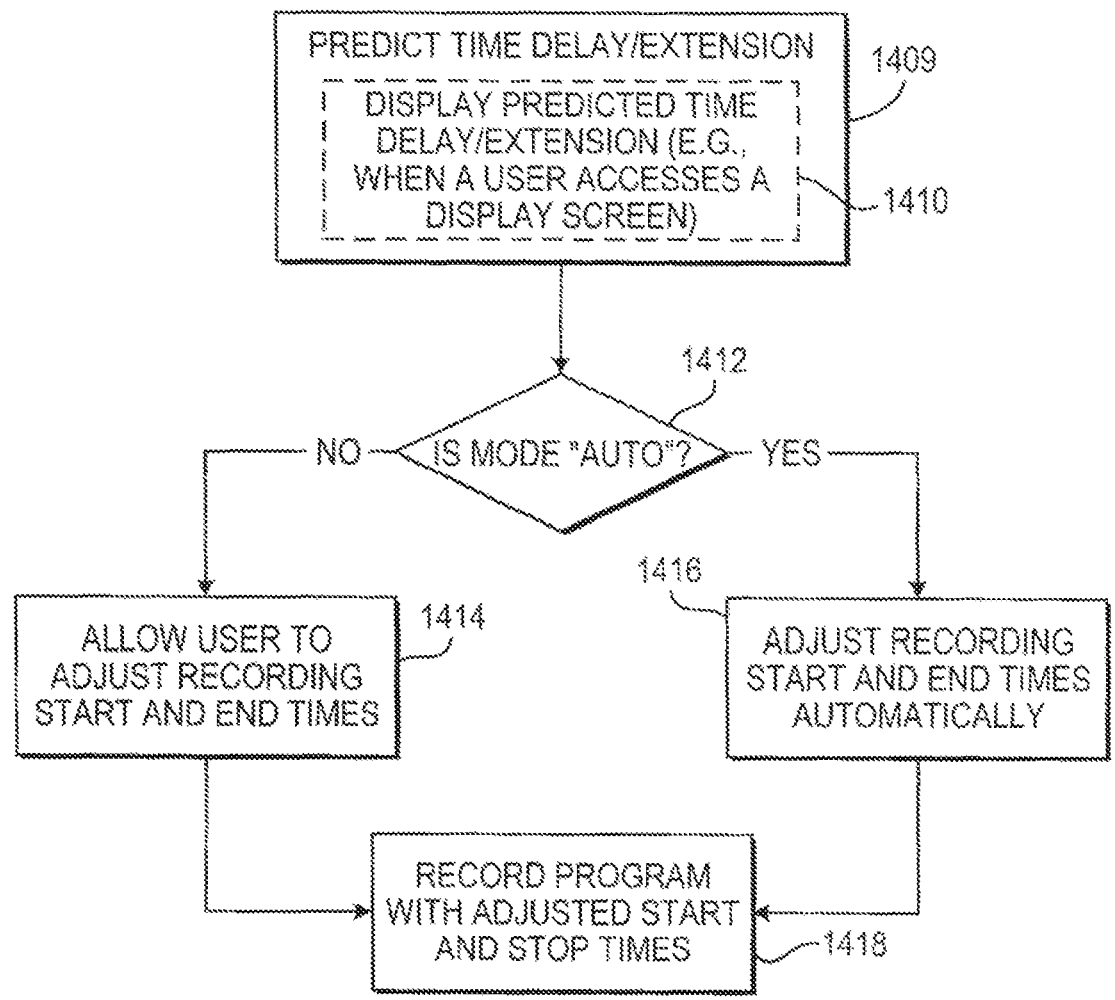
Figure 14C:
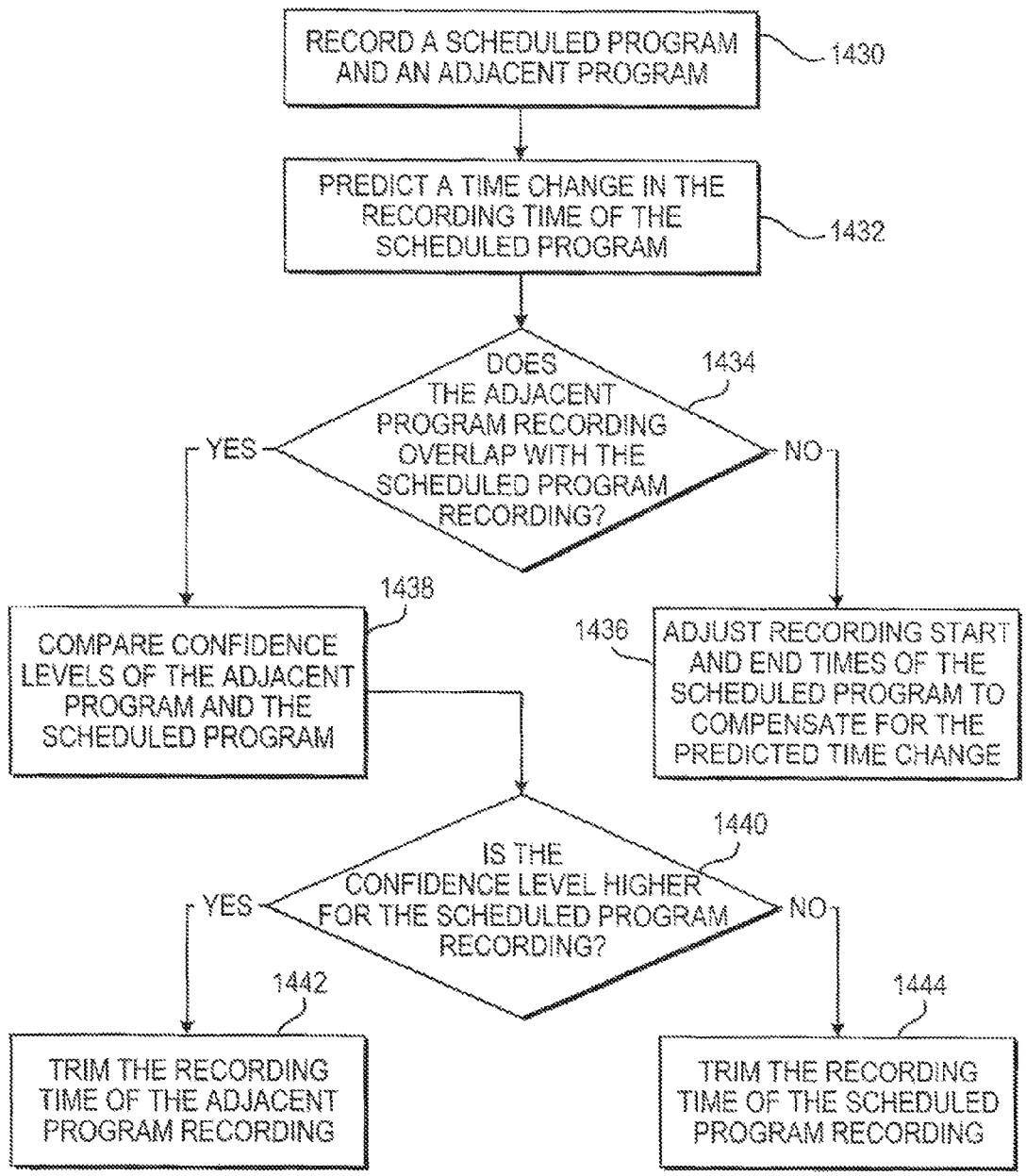
Figure 15:
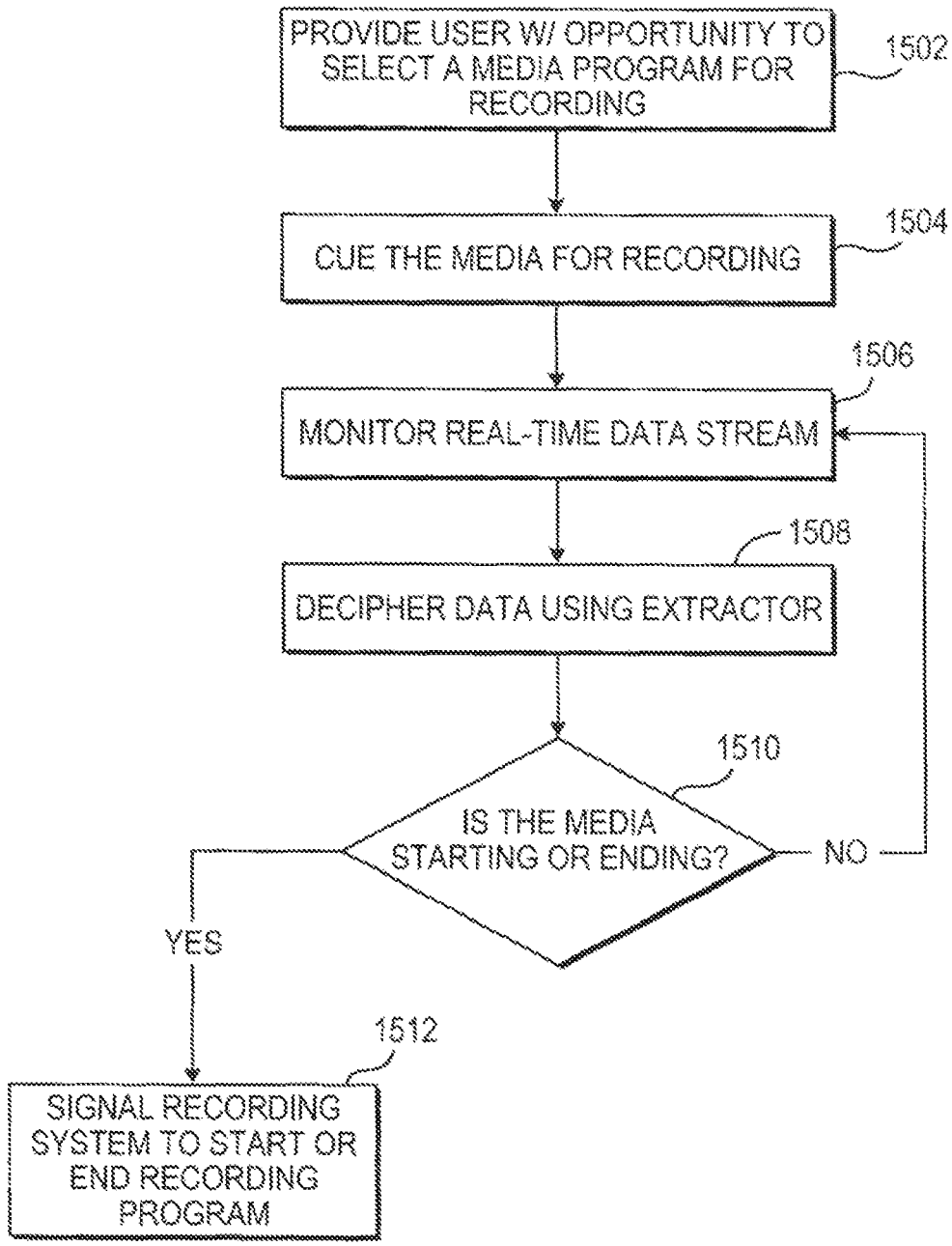
FIG. 15 is a flowchart of illustrative steps involved in monitoring a real-time data stream in accordance with an embodiment of the present invention.

FIGS. 13-15 are flowcharts of illustrative steps involved in some embodiments of the present invention. The steps shown in FIGS. 13-15 are only illustrative and may be performed in any suitable order. In practice, steps may be added, omitted, or combined.

FIG. 13 is a flowchart of illustrative steps involved in adjusting the recording time of a selected program. At step 1302, the recording system may provide the user with an opportunity to select a program to be recorded (e.g., from program listings display screen 600 in FIG. 6). Program guide distribution equipment 56 of FIG. 2 or a data provider (e.g., data provider 1606 of FIG. 16) may distribute data associated with programs (e.g., data specified by program providers) to user television equipment 26 of FIG. 1 (e.g., set-top box 72). At step 1304, the program guide may determine whether the data associated with the program indicates a time change. If a time change is not indicated by the associated data, at step 1306, programs may be recorded at their scheduled times. At step 1312, if the associated data indicates that there will be a time change, time change information for that program may be provided to a user (e.g., displayed in display regions 1108 and 1109 of FIG. 11*a* or display regions 1152 and 1154 of FIG. 11*b*). Step 1312 may include substep 1314 that determines the duration of the time change by determining the time delay and/or extension in the program's nominal times. At step 1310, the program may be recorded with the time change to compensate for the time change indicated at step 1304. Step 1310 may include substep 1308 that determines the duration of the time change by determining the time delay and/or extension in the program's nominal times. When the recording time has been adjusted to compensate for the time change, the program may be properly recorded without cutoff or with a reduction in the cutoff that would have occurred without the adjustment. If desired step 1310 may be performed after displaying time change information in step 1312 or may be performed following the indication of a time change in step 1304.

A log of previous programs with time changes may be maintained to predict future program time changes. When a time change log includes a record of time changes that are related to a selected program, program guide distribution equipment 56 may transmit the time change log information or information that is based on the time change log information to user television equipment 26. The log may use channel history information, network history information, or any other suitable criteria in monitoring programming time changes. FIG. 14*a* is a flowchart of illustrative steps involved in predicting time changes. At step 1402, a log of previous programs with changed times may be maintained and stored on a program guide server such as program guide server 50 of FIG. 2 or in local memory such as memory 78 or digital storage device 76. When a user selects to record a program, the program guide server may poll a storage device (e.g., storage device 54) in step 1404 and search for any log entries that are related to the selected program. If no log entries are associated with or related to the program selection then the guide may not predict a time change at step 1406. For example, the text "Delay Information Not Available" and the text "Extension Information Not Available" may be displayed in regions 1180 and 1182 of FIG. 11*c*. If a stored log entry corresponds with or is related to the user's program selection in step 1404, time change information from the log may be used to predict a time delay and/or extension at step 1408. The user's program selection may be related to a stored log entry by a channel, a network, the actual program, or through any other applicable approach. Other suitable techniques may also be used, such as, using statistical analysis based on variations in air times by program type.

FIG. 14*b* is a flowchart of illustrative steps showing how the recording system may compensate for a predicted time change. At step 1409, a time change may be predicted. Step 1409 may include substep 1410 in which the predicted time change may be displayed. For example, when a user accesses the interactive program guide to display a display screen (e.g., display screen 1150 of FIG. 11*b*). At step 1412, the recording system may check to see if the recording mode is set to automatically compensate for time changes. For example, a user may select the mode of operation through option 1202 of FIGS. 12*a* and 12*b*. If the recording system is not set to automatic, at step 1414, the user may be provided with an opportunity to adjust recording settings.

For example, the user may adjust the start time in option 1204 and end time in option 1206 of FIG. 12a. If the operating mode is set to automatically respond to time changes, the scheduled recording times may be automatically adjusted to compensate for the time change in the start and end time of the program at step 1416. When the recording start and end times have been adjusted to compensate for time delays and/or extensions, the program may be recorded with the adjusted times at step 1418.

FIG. 14c is a flowchart of illustrative steps showing how the recording system may compensate for adjacent recordings when a time change is predicted. At step 1430, a recording system capable of only recording one program at a time (e.g., a VCR) may be set to record two programs, the programs being time adjacent to one other. For example, a first program, hereinafter the scheduled program, may be set to be recorded between 12:00 PM to 1:00 PM on one channel and an adjacent program may be set to be recorded from 1:00 PM to 1:30 PM on another channel. At step 1432, the scheduled program may experience a time change. When a time change occurs in this type of recording system, a check may be performed, at step 1434, to evaluate if there exists an adjacent program to be recorded. This may allow the recording system to detect overlapping in program recording and attempt to compensate accordingly to minimize cut-offs in the recording of the programs. If no adjacent program recording is present, then at step 1436 the recording system may accordingly adjust recording start and end times, for the scheduled program, to compensate for the predicted time change.

If step 1434 detects an adjacent program to be recorded then a confidence level in the predicted time change of the scheduled program may be determined. The confidence level of the scheduled program and the confidence level of the adjacent program are compared, at step 1438. The confidence level may be determined by, for example, evaluating the number of samples collected of previous time changes. The recording system may determine that the samples collected to provide the predicted time change of the scheduled program may not be sufficiently reliable when compared to the adjacent program. This may signal the recording system to assign the predicted time change of the scheduled program a low confidence level. If the confidence level is determined to be low, the recording system may trim the recording time of the scheduled program, at step 1444, in order to attempt to minimize cut-off in the more reliable adjacent program to be recorded. Although, if the confidence level is determined to be high for the recording of the scheduled program when compared to the recording of adjacent program, the recording system may trim the recording time of the adjacent program, at step 1442, to reduce cut-off in the recording of the scheduled program. Other suitable methods may be used to determine which of the adjacent recordings may be trimmed.

In yet another embodiment of the recording system, a real-time data stream may be monitored. FIG. 15 is an illustrative flowchart of such an embodiment. At step 1502, the user may be provided with an opportunity to select a program for recording. At step 1504, the selected program may be cued for recording (e.g., as illustrated by icon 802 of FIG. 8). When the program has been cued, a real-time data stream may be monitored in step 1506 by the recording system. In step 1508, an extractor (e.g., extractor 80 integrated in set-top box 72 of FIG. 3) may decipher the incoming data stream looking for a cue that the program is about to start or end. If the deciphered data stream indicates the program is starting or ending, the recording system may be signaled to begin or stop recording in step 1512, respectively, otherwise the recording system may continue to monitor the real-time data stream.

Figure 16:
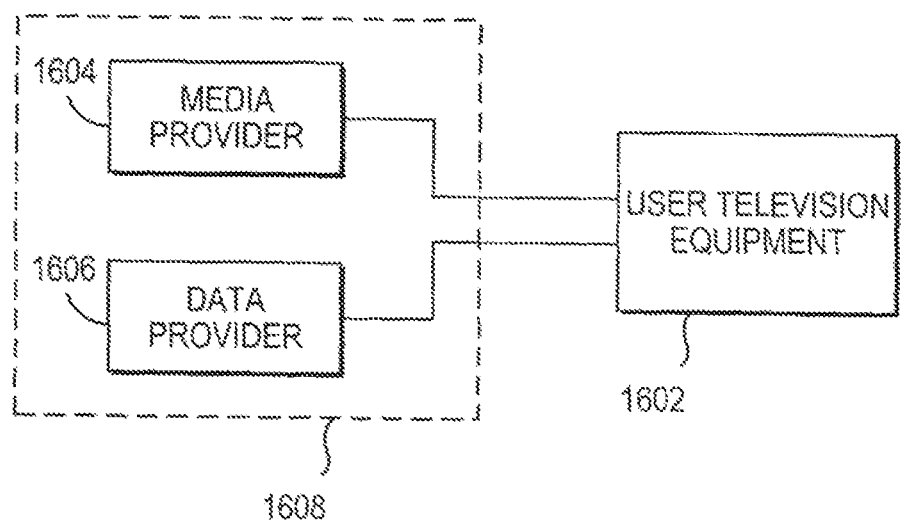
FIG. 16 is an illustrative schematic block diagram of a recording system in accordance with an embodiment of the present invention.

A simplified system diagram for providing automatic or manual adjustment of predicted or actual time delays and/or extensions is shown in FIG. 16. The system may include user television equipment 1602, such as the user television equipment that is discussed above in connection with FIGS. 1-4. The system may include media provider 1604 that may be a distribution facility for distributing media, such as television programming, radio, video-on-demand, pay-per-view, music-on-demand, etc., to user television equipment 1602. Media that is distributed may be real-time media may be real-time media of live events such as, live broadcasts of particular television programs (e.g., the live broadcast of the "Maryland vs. Duke" basketball game at 10:00 PM), may be real-time media such as radio station broadcasts of a particular music recording for listening as the music recording is being broadcast, etc.

As discussed above, a user may be allowed to view listings of upcoming media events (e.g., programs, songs, etc.) and allowed to select a media event to be automatically recorded based on a schedule (e.g., for the media event). Media provider 1604 may, for example, be a television distribution facility, a radio station, a network broadcast center, a computer network, etc., or a plurality of such. Data provider 1606 may be, among other things, a provider of time change information that is related to media events (e.g., media events that are scheduled for presentation to user's media providers).

As discussed above, time change information may be a predicted or an actual time change for an upcoming or current media event that is scheduled to be broadcast. Data provider 1606 may be a television distribution facility, radio station, computer server, computer network, Internet, etc., or a combination of such. Techniques for providing data to user television equipment 1602 are discussed above (e.g., using the VBI). If desired, media provider 1604 and data provider 1606 may be single facility 1608 (e.g., a television distribution facility that distributes a (prerecorded or live) program for live presentation to television viewers and distributes data that provides, among other things, time change information for the program). Data provider 1606 may distribute a real-time data stream for use by user television equipment 1602 (e.g., data for a program or programming may be distributed in real-time correspondence to the distribution of the program or programming to viewers).

Thus, systems and methods for reducing cut-offs in recording programs are provided.

One skilled in the art will appreciate that the present invention can be practiced by other than the described embodiments, which are presented for purposes of illustration and not of limitation, and the present invention is limited only by the claims which follow.

What is claimed is:

1. A method for reducing cut-offs when programs are recorded, the method comprising:
   receiving a user indication to record a program between an expected start time and an expected end time corresponding to the program;
   receiving data corresponding to the program;
   determining a program type of the program based on the data;
   accessing a database comprising a plurality of database entries that each indicate whether programs of a respective program type of a plurality of program types are subject to variation;

determining, prior to the expected start time, whether the program type is indicated by a database entry of the plurality of database entries as being subject to variation;

based on determining that the program type is indicated by the database entry as being subject to variation, generating for display a selectable option; and causing a recording of the program to extend beyond the expected end time based on receiving a selection of the selectable option.

2. The method of claim 1, further comprising, based on receiving the selection of the selectable option, generating for display a program identifier corresponding to the program along with an indicator that indicates that the program is subject to variation, wherein the program identifier is simultaneously generated for display with the expected start time and the expected end time, wherein the expected start time corresponds to a start of a scheduled broadcast time of the program, and wherein the expected end time corresponds to an end to the scheduled broadcast time of the program.

3. The method of claim 2, wherein the selectable option comprises a user-selectable setting to extend the recording of the program before the expected start time by a preset amount of time, and wherein the method further comprises:

receiving a user selection of the user-selectable setting; and based on receiving the user selection of the user-selectable setting, causing the recording of the program to start before the expected start time, at an instance that is offset from the expected start time by the preset amount of time.

4. The method of claim 2, wherein the selectable option comprises (1) a first user-selectable setting to extend the recording by a preset amount of time, and (2) a second user-selectable setting to automatically extend the recording, and wherein the method further comprises:

determining whether the user selected the first user-selectable setting or the second user-selectable setting;

based on determining that the user selected the first user-selectable setting, ending the recording of the program after the expected end time, at an instance that is offset from the expected end time by the preset amount of time; and based on determining that the user selected the second user-selectable setting, ending the recording of the program after the expected end time, based on an evaluation of program data during the broadcast of the program.

5. The method of claim 4, further comprising, in response to receiving a selection of the second user-selectable setting, generating for simultaneous display with a program identifier that identifies the program, an indication that the user selected the second user-selectable setting.

6. The method of claim 4, wherein the method further comprises, further based on determining that the user selected the second user-selectable setting:

monitoring data corresponding to a live broadcast of the program;

periodically evaluating, based on the data corresponding to the live broadcast of the program, whether the program will extend beyond the expected end time;

based on the evaluating, determining that the program will extend beyond the expected end time; and updating the expected end time to a new expected end time based on determining that the program will extend beyond the expected end time.

7. A system for reducing cut-offs when programs are recorded, the system comprising control circuitry configured to:

receive a user indication to record a program between an expected start time and an expected end time corresponding to the program;

receive data corresponding to the program;

determine a program type of the program based on the data;

access a database comprising a plurality of database entries that each indicate whether programs of a respective program type of a plurality of program types are subject to variation;

determine, prior to the expected start time, whether the program type is indicated by a database entry of the plurality of database entries as being subject to variation;

based on determining that the program type is indicated by the database entry as being subject to variation, generate for display a selectable option; and cause a recording of the program to extend beyond the expected end time based on receiving a selection of the selectable option.

8. The system of claim 7, wherein the control circuitry is further configured, based on receiving the selection of the selectable option, to generate for display a program identifier corresponding to the program along with an indicator that indicates that the program is subject to variation, wherein the program identifier is simultaneously generated for display with the expected start time and the expected end time, wherein the expected start time corresponds to a start of a scheduled broadcast time of the program, and wherein the expected end time corresponds to an end to the scheduled broadcast time of the program.

9. The system of claim 8, wherein the selectable option comprises a user-selectable setting to extend the recording of the program before the expected start time by a preset amount of time, and wherein the control circuitry is further configured to:

receive a user selection of the user-selectable setting; and based on receiving the user selection of the user-selectable setting, cause the recording of the program to start before the expected start time, at an instance that is offset from the expected start time by the preset amount of time.

10. The system of claim 8, wherein the selectable option comprises (1) a first user-selectable setting to extend the recording by a preset amount of time, and (2) a second user-selectable setting to automatically extend the recording, and wherein the control circuitry is further configured to:

determine whether the user selected the first user-selectable setting or the second user-selectable setting;

based on determining that the user selected the first user-selectable setting, end the recording of the program after the expected end time, at an instance that is offset from the expected end time by the preset amount of time; and based on determining that the user selected the second user-selectable setting, end the recording of the program after the expected end time, based on an evaluation of program data during the broadcast of the program.

11. The system of claim 10, wherein the control circuitry is further configured, in response to receiving a selection of the second user-selectable setting, to generate for simultaneous display with a program identifier that identifies the program, an indication that the user selected the second user-selectable setting.

12. The system of claim 10, wherein the control circuitry is further configured, further based on determining that the user selected the second user-selectable setting, to:
   monitor data corresponding to a live broadcast of the program;
   periodically evaluate, based on the data corresponding to the live broadcast of the program, whether the program will extend beyond the expected end time;
   based on the evaluating, determine that the program will extend beyond the expected end time; and
   update the expected end time to a new expected end time based on determining that the program will extend beyond the expected end time.

13. A non-transitory machine-readable medium comprising memory with instructions encoded thereon for reducing cut-offs when programs are recorded, the instructions comprising:
   instructions to receive a user indication to record a program between an expected start time and an expected end time corresponding to the program;
   instructions to receive data corresponding to the program;
   instructions to determine a program type of the program based on the data;
   instructions to access a database comprising a plurality of database entries that each indicate whether programs of a respective program type of a plurality of program types are subject to variation;
   instructions to determine, prior to the expected start time, whether the program type is indicated by a database entry of the plurality of database entries as being subject to variation;
   instructions to generate for display, based on determining that the program type is indicated by the database entry as being subject to variation, a selectable option; and
   instructions to cause a recording of the program to extend beyond the expected end time based on receiving a selection of the selectable option.

14. The non-transitory machine-readable medium of claim 13, further comprising instructions to generate for display, based on receiving the selection of the selectable option, a program identifier corresponding to the program along with an indicator that indicates that the program is subject to variation, wherein the program identifier is simultaneously generated for display with the expected start time and the expected end time, wherein the expected start time corresponds to a start of a scheduled broadcast time of the program, and wherein the expected end time corresponds to an end to the scheduled broadcast time of the program.

15. The non-transitory machine-readable medium of claim 14, wherein the selectable option comprises a user-selectable setting to extend the recording of the program before the expected start time by a preset amount of time, and wherein the instructions further comprise:
   instructions to receive a user selection of the user-selectable setting; and
   instructions to cause, based on receiving the user selection of the user-selectable setting, the recording of the program to start before the expected start time, at an instance that is offset from the expected start time by the preset amount of time.

16. The non-transitory machine-readable medium of claim 14, wherein the selectable option comprises (1) a first user-selectable setting to extend the recording by a preset amount of time, and (2) a second user-selectable setting to automatically extend the recording, and wherein the instructions further comprise:
   instructions to determine whether the user selected the first user-selectable setting or the second user-selectable setting;
   instructions to end the recording of the program, based on determining that the user selected the first user-selectable setting, after the expected end time, at an instance that is offset from the expected end time by the preset amount of time; and
   instructions to end the recording of the program after the expected end time, based on determining that the user selected the second user-selectable setting, and based on an evaluation of program data during the broadcast of the program.

17. The non-transitory machine-readable medium of claim 16, further comprising instructions to generate, in response to receiving a selection of the second user-selectable setting, for simultaneous display with a program identifier that identifies the program, an indication that the user selected the second user-selectable setting.

18. The non-transitory machine-readable medium of claim 16, wherein the instructions further comprise, further based on determining that the user selected the second user-selectable setting:
   instructions to monitor data corresponding to a live broadcast of the program;
   instructions to periodically evaluate, based on the data corresponding to the live broadcast of the program, whether the program will extend beyond the expected end time;
   instructions to determine, based on the evaluating, that the program will extend beyond the expected end time; and
   instructions to update the expected end time to a new expected end time based on determining that the program will extend beyond the expected end time.

* * * * *